US007517505B2

(12) United States Patent
Botvinnik et al.

(10) Patent No.: US 7,517,505 B2
(45) Date of Patent: Apr. 14, 2009

(54) ELECTRO-KINETIC AIR TRANSPORTER AND CONDITIONER DEVICES WITH 3/2 CONFIGURATION HAVING DRIVER ELECTRODES

(75) Inventors: Igor Y. Botvinnik, Novato, CA (US); Andrew J. Parker, Novato, CA (US); Charles E. Taylor, Punta Gorda, FL (US)

(73) Assignee: Sharper Image Acquisition LLC, New York, NY (US)

( * ) Notice: Subject to any disclaimer, the term of this patent is extended or adjusted under 35 U.S.C. 154(b) by 857 days.

(21) Appl. No.: 11/007,734

(22) Filed: Dec. 8, 2004

(65) Prior Publication Data

US 2005/0152818 A1 Jul. 14, 2005

Related U.S. Application Data

(63) Continuation of application No. 10/717,420, filed on Nov. 19, 2003, now abandoned.

(60) Provisional application No. 60/500,437, filed on Sep. 5, 2003.

(51) Int. Cl.
*B01J 19/08* (2006.01)

(52) U.S. Cl. ....................... 422/186.04; 422/121; 96/96

(58) Field of Classification Search ............ 422/186.04, 422/121; 96/96
See application file for complete search history.

(56) References Cited

U.S. PATENT DOCUMENTS

| | | | |
|---|---|---|---|
| 653,421 | A | 7/1900 | Lorey |
| 895,729 | A | 8/1908 | Carlborg |
| 995,958 | A | 6/1911 | Goldberg |
| 1,791,338 | A | 2/1931 | Wintermute |
| 1,869,335 | A | 7/1932 | Day |
| 1,882,949 | A | 10/1932 | Ruder |
| 2,129,783 | A | 9/1938 | Penney |
| 2,327,588 | A | 8/1943 | Bennett |
| 2,359,057 | A | 9/1944 | Skinner |
| 2,509,548 | A | 5/1950 | White |
| 2,590,447 | A | 3/1952 | Nord et al. |

(Continued)

FOREIGN PATENT DOCUMENTS

| | | | |
|---|---|---|---|
| CN | 2111112 | U | 7/1972 |

(Continued)

OTHER PUBLICATIONS

U.S. Appl. No. 60/104,573, filed Oct. 16, 1998, Krichtafovitch.

(Continued)

*Primary Examiner*—Kishor Mayekar

(57) ABSTRACT

Electro-kinetic air transporter and conditioner systems and methods are provided. A system includes at least one emitter electrode and at least a one collector (and likely, at least a pair of collector electrodes) that are downstream from the emitter electrode. An insulated driver electrode is located adjacent a collector electrode, and where there is at least a pair of collector electrodes, between each pair of collector electrodes. A high voltage source provides a voltage potential to the at least one of the emitter electrode and the collector electrode(s), to thereby provide a potential different therebetween. The insulated driver electrode(s) may or may not be at a same voltage potential as the emitter electrode, but should be at a different voltage potential than the collector electrode(s).

20 Claims, 17 Drawing Sheets

U.S. PATENT DOCUMENTS

| | | | | | |
|---|---|---|---|---|---|
| 2,949,550 | A | | 8/1960 | Brown | |
| 3,018,394 | A | | 1/1962 | Brown | |
| 3,026,964 | A | | 3/1962 | Penney | |
| 3,374,941 | A | | 3/1968 | Okress | |
| 3,518,462 | A | | 6/1970 | Brown | |
| 3,540,191 | A | | 11/1970 | Herman | |
| 3,581,470 | A | | 6/1971 | Aitkenhead et al. | |
| 3,638,058 | A | | 1/1972 | Fritzius | |
| 3,744,216 | A | | 7/1973 | Halloran | |
| 3,806,763 | A | | 4/1974 | Masuda | |
| 3,892,927 | A | | 7/1975 | Lindenberg | |
| 3,945,813 | A | | 3/1976 | Iinoya et al. | |
| 3,958,960 | A | | 5/1976 | Bakke | |
| 3,958,961 | A | | 5/1976 | Bakke | |
| 3,958,962 | A | | 5/1976 | Hayashi | |
| 3,981,695 | A | | 9/1976 | Fuchs | |
| 3,984,215 | A | | 10/1976 | Zucker | |
| 3,988,131 | A | | 10/1976 | Kanazawa et al. | |
| 4,007,024 | A | | 2/1977 | Sallee et al. | |
| 4,052,177 | A | | 10/1977 | Kide | |
| 4,056,372 | A | | 11/1977 | Hayashi | |
| 4,070,163 | A | | 1/1978 | Kolb et al. | |
| 4,074,983 | A | | 2/1978 | Bakke | |
| 4,092,134 | A | | 5/1978 | Kikuchi | |
| 4,097,252 | A | | 6/1978 | Kirchhoff et al. | |
| 4,102,654 | A | | 7/1978 | Pellin | |
| 4,104,042 | A | | 8/1978 | Brozenick | |
| 4,110,086 | A | | 8/1978 | Schwab et al. | |
| 4,119,415 | A | | 10/1978 | Hayashi et al. | |
| 4,126,434 | A | | 11/1978 | Keiichi | |
| 4,138,233 | A | | 2/1979 | Masuda | |
| 4,147,522 | A | | 4/1979 | Gonas et al. | |
| 4,155,792 | A | | 5/1979 | Gelhaar et al. | |
| 4,171,975 | A | | 10/1979 | Kato et al. | |
| 4,185,971 | A | | 1/1980 | Isahaya | |
| 4,189,308 | A | | 2/1980 | Feldman | |
| 4,205,969 | A | | 6/1980 | Matsumoto | |
| 4,209,306 | A | | 6/1980 | Feldman et al. | |
| 4,218,225 | A | | 8/1980 | Kirchhoff et al. | |
| 4,225,323 | A | | 9/1980 | Zarchy et al. | |
| 4,227,894 | A | | 10/1980 | Proynoff | |
| 4,231,766 | A | | 11/1980 | Spurgin | |
| 4,232,355 | A | | 11/1980 | Finger et al. | |
| 4,244,710 | A | | 1/1981 | Burger | |
| 4,244,712 | A | | 1/1981 | Tongret | |
| 4,251,234 | A | | 2/1981 | Chang | |
| 4,253,852 | A | | 3/1981 | Adams | |
| 4,259,093 | A | | 3/1981 | Vlastos et al. | |
| 4,259,452 | A | | 3/1981 | Yukuta et al. | |
| 4,259,707 | A | | 3/1981 | Penney | |
| 4,264,343 | A | * | 4/1981 | Natarajan et al. | 96/48 |
| 4,266,948 | A | | 5/1981 | Teague et al. | |
| 4,282,014 | A | | 8/1981 | Winkler et al. | |
| 4,284,420 | A | | 8/1981 | Borysiak | |
| 4,289,504 | A | | 9/1981 | Scholes | |
| 4,293,319 | A | | 10/1981 | Claassen, Jr. | |
| 4,308,036 | A | | 12/1981 | Zahedi et al. | |
| 4,315,188 | A | | 2/1982 | Cerny et al. | |
| 4,318,718 | A | | 3/1982 | Utsumi et al. | |
| 4,338,560 | A | | 7/1982 | Lemley | |
| 4,342,571 | A | | 8/1982 | Hayashi | |
| 4,349,359 | A | | 9/1982 | Fitch et al. | |
| 4,351,648 | A | | 9/1982 | Penney | |
| 4,354,861 | A | | 10/1982 | Kalt | |
| 4,357,150 | A | | 11/1982 | Masuda et al. | |
| 4,362,632 | A | | 12/1982 | Jacob | |
| 4,363,072 | A | | 12/1982 | Coggins | |
| 4,366,525 | A | | 12/1982 | Baumgartner | |
| 4,369,776 | A | | 1/1983 | Roberts | |
| 4,375,364 | A | | 3/1983 | Van Hoesen et al. | |
| 4,380,900 | A | | 4/1983 | Linder et al. | |
| 4,386,395 | A | | 5/1983 | Francis, Jr. | |
| 4,391,614 | A | | 7/1983 | Rozmus | |
| 4,394,239 | A | | 7/1983 | Kitzelmann et al. | |
| 4,405,342 | A | | 9/1983 | Bergman | |
| 4,406,671 | A | | 9/1983 | Rozmus | |
| 4,412,850 | A | | 11/1983 | Kurata et al. | |
| 4,413,225 | A | | 11/1983 | Donig et al. | |
| 4,414,603 | A | | 11/1983 | Masuda | |
| 4,435,190 | A | | 3/1984 | Taillet et al. | |
| 4,440,552 | A | | 4/1984 | Uchiya et al. | |
| 4,443,234 | A | | 4/1984 | Carlsson | |
| 4,445,911 | A | | 5/1984 | Lind | |
| 4,477,263 | A | | 10/1984 | Shaver et al. | |
| 4,477,268 | A | | 10/1984 | Kalt | |
| 4,481,017 | A | | 11/1984 | Furlong | |
| 4,496,375 | A | | 1/1985 | Levantine | |
| 4,502,002 | A | | 2/1985 | Ando | |
| 4,505,724 | A | | 3/1985 | Baab | |
| 4,509,958 | A | | 4/1985 | Masuda et al. | |
| 4,514,780 | A | | 4/1985 | Brussee et al. | |
| 4,515,982 | A | | 5/1985 | Lechtken et al. | |
| 4,516,991 | A | | 5/1985 | Kawashima | |
| 4,521,229 | A | | 6/1985 | Baker et al. | |
| 4,522,634 | A | | 6/1985 | Frank | |
| 4,534,776 | A | | 8/1985 | Mammel et al. | |
| 4,536,698 | A | | 8/1985 | Shevalenko et al. | |
| 4,544,382 | A | | 10/1985 | Taillet et al. | |
| 4,555,252 | A | | 11/1985 | Eckstein | |
| 4,569,684 | A | | 2/1986 | Ibbott | |
| 4,582,961 | A | | 4/1986 | Frederiksen | |
| 4,587,475 | A | | 5/1986 | Finney, Jr. et al. | |
| 4,588,423 | A | | 5/1986 | Gillingham et al. | |
| 4,590,042 | A | | 5/1986 | Drage | |
| 4,597,780 | A | | 7/1986 | Reif | |
| 4,597,781 | A | | 7/1986 | Spector | |
| 4,600,411 | A | | 7/1986 | Santamaria | |
| 4,601,733 | A | | 7/1986 | Ordines et al. | |
| 4,604,174 | A | | 8/1986 | Bollinger et al. | |
| 4,614,573 | A | | 9/1986 | Masuda | |
| 4,623,365 | A | | 11/1986 | Bergman | |
| 4,626,261 | A | | 12/1986 | Jorgensen | |
| 4,632,135 | A | | 12/1986 | Lenting et al. | |
| 4,632,746 | A | | 12/1986 | Bergman | |
| 4,636,981 | A | | 1/1987 | Ogura | |
| 4,643,744 | A | | 2/1987 | Brooks | |
| 4,643,745 | A | | 2/1987 | Sakakibara et al. | |
| 4,647,836 | A | | 3/1987 | Olsen | |
| 4,650,648 | A | | 3/1987 | Beer et al. | |
| 4,656,010 | A | | 4/1987 | Leitzke et al. | |
| 4,657,738 | A | | 4/1987 | Kanter et al. | |
| 4,659,342 | A | | 4/1987 | Lind | |
| 4,662,903 | A | | 5/1987 | Yanagawa | |
| 4,666,474 | A | | 5/1987 | Cook | |
| 4,668,479 | A | | 5/1987 | Manabe et al. | |
| 4,670,026 | A | | 6/1987 | Hoenig | |
| 4,673,416 | A | * | 6/1987 | Sakakibara et al. | 96/79 |
| 4,674,003 | A | | 6/1987 | Zylka | |
| 4,680,496 | A | | 7/1987 | Letournel et al. | |
| 4,686,370 | A | | 8/1987 | Blach | |
| 4,689,056 | A | | 8/1987 | Noguchi et al. | |
| 4,691,829 | A | | 9/1987 | Auer | |
| 4,692,174 | A | | 9/1987 | Gelfand et al. | |
| 4,693,869 | A | | 9/1987 | Pfaff | |
| 4,694,376 | A | | 9/1987 | Gesslauer | |
| 4,702,752 | A | | 10/1987 | Yanagawa | |
| 4,713,092 | A | | 12/1987 | Kikuchi et al. | |
| 4,713,093 | A | | 12/1987 | Hansson | |
| 4,713,724 | A | | 12/1987 | Voelkel | |
| 4,715,870 | A | | 12/1987 | Masuda et al. | |
| 4,725,289 | A | | 2/1988 | Quintilian | |
| 4,726,812 | A | | 2/1988 | Hirth | |
| 4,726,814 | A | | 2/1988 | Weitman | |
| 4,736,127 | A | | 4/1988 | Jacobsen | |

| | | | | |
|---|---|---|---|---|
| 4,743,275 | A | | 5/1988 | Flanagan |
| 4,749,390 | A | | 6/1988 | Burnett et al. |
| 4,750,921 | A | | 6/1988 | Sugita et al. |
| 4,760,302 | A | | 7/1988 | Jacobsen |
| 4,760,303 | A | | 7/1988 | Miyake |
| 4,765,802 | A | | 8/1988 | Gombos et al. |
| 4,771,361 | A | | 9/1988 | Varga |
| 4,772,297 | A | | 9/1988 | Anzai |
| 4,779,182 | A | | 10/1988 | Mickal et al. |
| 4,781,736 | A | | 11/1988 | Cheney et al. |
| 4,786,844 | A | | 11/1988 | Farrell et al. |
| 4,789,801 | A | * | 12/1988 | Lee ............................ 310/308 |
| 4,808,200 | A | | 2/1989 | Dallhammer et al. |
| 4,811,159 | A | | 3/1989 | Foster, Jr. |
| 4,822,381 | A | | 4/1989 | Mosley et al. |
| 4,853,005 | A | | 8/1989 | Jaisinghani et al. |
| 4,869,736 | A | | 9/1989 | Ivester et al. |
| 4,892,713 | A | | 1/1990 | Newman |
| 4,929,139 | A | | 5/1990 | Vorreiter et al. |
| 4,940,470 | A | | 7/1990 | Jaisinghani et al. |
| 4,940,894 | A | | 7/1990 | Morters |
| 4,941,068 | A | | 7/1990 | Hofmann |
| 4,941,224 | A | | 7/1990 | Saeki et al. |
| 4,944,778 | A | | 7/1990 | Yanagawa |
| 4,954,320 | A | | 9/1990 | Birmingham et al. |
| 4,955,991 | A | | 9/1990 | Torok et al. |
| 4,966,666 | A | | 10/1990 | Waltonen |
| 4,967,119 | A | | 10/1990 | Torok et al. |
| 4,976,752 | A | | 12/1990 | Torok et al. |
| 4,978,372 | A | | 12/1990 | Pick |
| D315,598 | S | | 3/1991 | Yamamoto et al. |
| 5,003,774 | A | | 4/1991 | Leonard |
| 5,006,761 | A | | 4/1991 | Torok et al. |
| 5,010,869 | A | | 4/1991 | Lee |
| 5,012,093 | A | | 4/1991 | Shimizu |
| 5,012,094 | A | | 4/1991 | Hamade |
| 5,012,159 | A | | 4/1991 | Torok et al. |
| 5,022,979 | A | | 6/1991 | Hijikata et al. |
| 5,024,685 | A | | 6/1991 | Torok et al. |
| 5,030,254 | A | | 7/1991 | Heyen et al. |
| 5,034,033 | A | | 7/1991 | Alsup et al. |
| 5,037,456 | A | | 8/1991 | Yu |
| 5,045,095 | A | | 9/1991 | You |
| 5,053,912 | A | | 10/1991 | Loreth et al. |
| 5,059,219 | A | | 10/1991 | Plaks et al. |
| 5,061,462 | A | | 10/1991 | Suzuki |
| 5,066,313 | A | | 11/1991 | Mallory, Sr. |
| 5,072,746 | A | | 12/1991 | Kantor |
| 5,076,820 | A | | 12/1991 | Gurvitz |
| 5,077,468 | A | | 12/1991 | Hamade |
| 5,077,500 | A | | 12/1991 | Torok et al. |
| 5,100,440 | A | | 3/1992 | Stahel et al. |
| RE33,927 | E | | 5/1992 | Fuzimura |
| D326,514 | S | | 5/1992 | Alsup et al. |
| 5,118,942 | A | | 6/1992 | Hamade |
| 5,125,936 | A | | 6/1992 | Johansson |
| 5,136,461 | A | | 8/1992 | Zellweger |
| 5,137,546 | A | | 8/1992 | Steinbacher et al. |
| 5,141,529 | A | | 8/1992 | Oakley et al. |
| 5,141,715 | A | | 8/1992 | Sackinger et al. |
| D329,284 | S | | 9/1992 | Patton |
| 5,147,429 | A | | 9/1992 | Bartholomew et al. |
| 5,154,733 | A | | 10/1992 | Fujii et al. |
| 5,158,580 | A | | 10/1992 | Chang |
| D332,655 | S | | 1/1993 | Lytle et al. |
| 5,180,404 | A | | 1/1993 | Loreth et al. |
| 5,183,480 | A | | 2/1993 | Raterman et al. |
| 5,196,171 | A | | 3/1993 | Peltier |
| 5,198,003 | A | | 3/1993 | Haynes |
| 5,199,257 | A | | 4/1993 | Colletta et al. |
| 5,210,678 | A | | 5/1993 | Lain et al. |
| 5,215,558 | A | | 6/1993 | Moon |
| 5,217,504 | A | | 6/1993 | Johansson |
| 5,217,511 | A | | 6/1993 | Plaks et al. |
| 5,234,555 | A | | 8/1993 | Ibbott |
| 5,248,324 | A | | 9/1993 | Hara |
| 5,250,267 | A | | 10/1993 | Johnson et al. |
| 5,254,155 | A | | 10/1993 | Mensi |
| 5,266,004 | A | | 11/1993 | Tsumurai et al. |
| 5,271,763 | A | | 12/1993 | Jang |
| 5,282,891 | A | | 2/1994 | Durham |
| 5,290,343 | A | | 3/1994 | Morita et al. |
| 5,296,019 | A | | 3/1994 | Oakley et al. |
| 5,302,190 | A | | 4/1994 | Williams |
| 5,308,586 | A | | 5/1994 | Fritsche et al. |
| 5,315,838 | A | | 5/1994 | Thompson |
| 5,316,741 | A | | 5/1994 | Sewell et al. |
| 5,330,559 | A | | 7/1994 | Cheney et al. |
| 5,348,571 | A | | 9/1994 | Weber |
| 5,376,168 | A | | 12/1994 | Inculet |
| 5,378,978 | A | | 1/1995 | Gallo et al. |
| 5,386,839 | A | | 2/1995 | Chen |
| 5,395,430 | A | | 3/1995 | Lundgren et al. |
| 5,401,301 | A | | 3/1995 | Schulmerich et al. |
| 5,401,302 | A | | 3/1995 | Schulmerich et al. |
| 5,403,383 | A | | 4/1995 | Jaisinghani |
| 5,405,434 | A | | 4/1995 | Inculet |
| 5,407,469 | A | | 4/1995 | Sun |
| 5,407,639 | A | | 4/1995 | Watanabe et al. |
| 5,417,936 | A | | 5/1995 | Suzuki et al. |
| 5,419,953 | A | | 5/1995 | Chapman |
| 5,433,772 | A | | 7/1995 | Sikora |
| 5,435,817 | A | | 7/1995 | Davis et al. |
| 5,435,978 | A | | 7/1995 | Yokomi |
| 5,437,713 | A | | 8/1995 | Chang |
| 5,437,843 | A | | 8/1995 | Kuan |
| 5,445,798 | A | | 8/1995 | Ikeda et al. |
| 5,466,279 | A | | 11/1995 | Hattori et al. |
| 5,468,454 | A | | 11/1995 | Kim |
| 5,474,599 | A | | 12/1995 | Cheney et al. |
| 5,484,472 | A | | 1/1996 | Weinberg |
| 5,484,473 | A | | 1/1996 | Bontempi |
| 5,492,678 | A | | 2/1996 | Ota et al. |
| 5,501,844 | A | | 3/1996 | Kasting, Jr. et al. |
| 5,503,808 | A | | 4/1996 | Garbutt et al. |
| 5,503,809 | A | | 4/1996 | Coate et al. |
| 5,505,914 | A | | 4/1996 | Tona-Serra |
| 5,508,008 | A | | 4/1996 | Wasser |
| 5,514,345 | A | | 5/1996 | Garbutt et al. |
| 5,516,493 | A | | 5/1996 | Bell et al. |
| 5,518,531 | A | | 5/1996 | Joannu |
| 5,520,887 | A | | 5/1996 | Shimizu et al. |
| 5,525,310 | A | | 6/1996 | Decker et al. |
| 5,529,613 | A | | 6/1996 | Yavnieli |
| 5,529,760 | A | | 6/1996 | Burris |
| 5,532,798 | A | | 7/1996 | Nakagami et al. |
| 5,535,089 | A | | 7/1996 | Ford et al. |
| 5,536,477 | A | | 7/1996 | Cha et al. |
| 5,538,695 | A | | 7/1996 | Shinjo et al. |
| 5,540,761 | A | | 7/1996 | Yamamoto |
| 5,542,967 | A | | 8/1996 | Ponizovsky et al. |
| 5,545,379 | A | | 8/1996 | Gray |
| 5,545,380 | A | | 8/1996 | Gray |
| 5,547,643 | A | | 8/1996 | Nomoto et al. |
| 5,549,874 | A | | 8/1996 | Kimiya et al. |
| 5,554,344 | A | | 9/1996 | Duarte |
| 5,554,345 | A | | 9/1996 | Kitchenman |
| 5,569,368 | A | | 10/1996 | Larsky et al. |
| 5,569,437 | A | | 10/1996 | Stiehl et al. |
| D375,546 | S | | 11/1996 | Lee |
| 5,571,483 | A | | 11/1996 | Pfingstl et al. |
| 5,573,577 | A | | 11/1996 | Joannou |
| 5,573,730 | A | | 11/1996 | Gillum |
| 5,578,112 | A | | 11/1996 | Krause |
| 5,578,280 | A | | 11/1996 | Kazi et al. |
| 5,582,632 | A | | 12/1996 | Nohr et al. |

5,587,131 A 12/1996 Malkin et al.
D377,523 S 1/1997 Marvin et al.
5,591,253 A 1/1997 Altman et al.
5,591,334 A 1/1997 Shimizu et al.
5,591,412 A 1/1997 Jones et al.
5,593,476 A 1/1997 Coppom
5,601,636 A 2/1997 Glucksman
5,603,752 A 2/1997 Hara
5,603,893 A 2/1997 Gundersen et al.
5,614,002 A 3/1997 Chen
5,624,476 A 4/1997 Eyraud
5,630,866 A 5/1997 Gregg
5,630,990 A 5/1997 Conrad et al.
5,637,198 A 6/1997 Breault
5,637,279 A 6/1997 Besen et al.
5,641,342 A 6/1997 Smith et al.
5,641,461 A 6/1997 Ferone
5,647,890 A 7/1997 Yamamoto
5,648,049 A 7/1997 Jones et al.
5,655,210 A 8/1997 Gregoire et al.
5,656,063 A 8/1997 Hsu
5,665,147 A 9/1997 Taylor et al.
5,667,563 A 9/1997 Silva, Jr.
5,667,564 A 9/1997 Weinberg
5,667,565 A 9/1997 Gondar
5,667,756 A 9/1997 Ho
5,669,963 A 9/1997 Horton et al.
5,678,237 A 10/1997 Powell et al.
5,681,434 A 10/1997 Eastlund
5,681,533 A 10/1997 Hiromi
5,698,164 A 12/1997 Kishioka et al.
5,702,507 A 12/1997 Wang
D389,567 S 1/1998 Gudefin
5,766,318 A 6/1998 Loreth et al.
5,779,769 A 7/1998 Jiang
5,814,135 A 9/1998 Weinberg
5,879,435 A 3/1999 Satyapal et al.
5,893,977 A 4/1999 Pucci
5,911,957 A 6/1999 Khatchatrian et al.
5,972,076 A 10/1999 Nichols et al.
5,975,090 A 11/1999 Taylor et al.
5,980,614 A 11/1999 Loreth et al.
5,993,521 A 11/1999 Loreth et al.
5,997,619 A 12/1999 Knuth et al.
6,019,815 A 2/2000 Satyapal et al.
6,042,637 A * 3/2000 Weinberg ...................... 96/58
6,063,168 A 5/2000 Nichols et al.
6,086,657 A 7/2000 Freije
6,117,216 A 9/2000 Loreth
6,118,645 A 9/2000 Partridge
6,126,722 A 10/2000 Mitchell et al.
6,126,727 A 10/2000 Lo
6,149,717 A 11/2000 Satyapal et al.
6,149,815 A 11/2000 Sauter
6,152,146 A 11/2000 Taylor et al.
6,163,098 A 12/2000 Taylor et al.
6,176,977 B1 * 1/2001 Taylor et al. ................ 204/176
6,182,461 B1 2/2001 Washburn et al.
6,182,671 B1 2/2001 Taylor et al.
6,193,852 B1 2/2001 Caracciolo et al.
6,203,600 B1 3/2001 Loreth
6,212,883 B1 4/2001 Kang
6,228,149 B1 5/2001 Alenichev et al.
6,252,012 B1 6/2001 Egitto et al.
6,270,733 B1 8/2001 Rodden
6,277,248 B1 8/2001 Ishioka et al.
6,282,106 B2 8/2001 Grass
D449,097 S 10/2001 Smith et al.
D449,679 S 10/2001 Smith et al.
6,296,692 B1 10/2001 Gutmann
6,302,944 B1 10/2001 Hoenig
6,309,514 B1 10/2001 Conrad et al.
6,312,507 B1 11/2001 Taylor et al.
6,315,821 B1 11/2001 Pillion et al.
6,328,791 B1 12/2001 Pillion et al.
6,348,103 B1 2/2002 Ahlborn et al.
6,350,417 B1 2/2002 Lau et al.
6,362,604 B1 3/2002 Cravey
6,372,097 B1 4/2002 Chen
6,373,723 B1 4/2002 Wallgren et al.
6,379,427 B1 4/2002 Siess
6,391,259 B1 5/2002 Malkin et al.
6,398,852 B1 6/2002 Loreth
6,447,587 B1 9/2002 Pillion et al.
6,451,266 B1 9/2002 Lau et al.
6,464,754 B1 10/2002 Ford
6,471,753 B1 10/2002 Ahn et al.
6,494,940 B1 12/2002 Hak
6,504,308 B1 1/2003 Krichtafovitch et al.
6,508,982 B1 1/2003 Shoji
6,544,485 B1 4/2003 Taylor
6,585,935 B1 7/2003 Taylor et al.
6,588,434 B2 7/2003 Taylor et al.
6,603,268 B2 8/2003 Lee
6,613,277 B1 9/2003 Monagan
6,632,407 B1 10/2003 Lau et al.
6,635,105 B2 10/2003 Ahlborn et al.
6,672,315 B2 1/2004 Taylor et al.
6,709,484 B2 3/2004 Lau et al.
6,713,026 B2 3/2004 Taylor et al.
6,735,830 B1 5/2004 Merciel
6,749,667 B2 6/2004 Reeves et al.
6,753,652 B2 6/2004 Kim
6,761,796 B2 7/2004 Srivastava et al.
6,768,108 B2 7/2004 Hirano et al.
6,768,110 B2 7/2004 Alani
6,768,120 B2 7/2004 Leung et al.
6,768,121 B2 7/2004 Horskey
6,770,878 B2 8/2004 Uhlemann et al.
6,774,359 B1 8/2004 Hirabayashi et al.
6,777,686 B2 8/2004 Olson et al.
6,777,699 B1 8/2004 Miley et al.
6,777,882 B2 8/2004 Goldberg et al.
6,781,136 B1 8/2004 Kato
6,785,912 B1 9/2004 Julio
6,791,814 B2 9/2004 Adachi et al.
6,794,661 B2 9/2004 Tsukihara et al.
6,797,339 B2 9/2004 Akizuki et al.
6,797,964 B2 9/2004 Yamashita
6,799,068 B1 9/2004 Hartmann et al.
6,800,862 B2 10/2004 Matsumoto et al.
6,803,585 B2 10/2004 Glukhoy
6,805,916 B2 10/2004 Cadieu
6,806,035 B1 10/2004 Atireklapvarodom et al.
6,806,163 B2 10/2004 Wu et al.
6,806,468 B2 10/2004 Laiko et al.
6,808,606 B2 10/2004 Thomsen et al.
6,809,310 B2 10/2004 Chen
6,809,312 B1 10/2004 Park et al.
6,809,325 B2 10/2004 Dahl et al.
6,812,647 B2 11/2004 Cornelius
6,815,690 B2 11/2004 Veerasamy et al.
6,818,257 B2 11/2004 Amann et al.
6,818,909 B2 11/2004 Murrell et al.
6,819,053 B2 11/2004 Johnson
6,863,869 B2 3/2005 Taylor et al.
6,896,853 B2 5/2005 Law et al.
6,911,186 B2 6/2005 Taylor et al.
2001/0048906 A1 12/2001 Lau et al.
2002/0069760 A1 6/2002 Pruette et al.
2002/0079212 A1 6/2002 Taylor et al.
2002/0098131 A1 7/2002 Taylor et al.
2002/0122751 A1 9/2002 Sinaiko et al.
2002/0122752 A1 9/2002 Taylor et al.
2002/0127156 A1 9/2002 Taylor
2002/0134664 A1 9/2002 Taylor et al.

| | | | |
|---|---|---|---|
| 2002/0134665 | A1 | 9/2002 | Taylor et al. |
| 2002/0141914 | A1 | 10/2002 | Lau et al. |
| 2002/0144601 | A1 | 10/2002 | Palestro et al. |
| 2002/0146356 | A1 | 10/2002 | Sinaiko et al. |
| 2002/0150520 | A1 | 10/2002 | Taylor et al. |
| 2002/0152890 | A1 | 10/2002 | Leiser |
| 2002/0155041 | A1 | 10/2002 | McKinney, Jr. et al. |
| 2002/0170435 | A1 | 11/2002 | Joannou |
| 2002/0190658 | A1 | 12/2002 | Lee |
| 2002/0195951 | A1 | 12/2002 | Lee |
| 2003/0005824 | A1 | 1/2003 | Katou et al. |
| 2003/0170150 | A1 | 9/2003 | Law et al. |
| 2003/0206837 | A1 | 11/2003 | Taylor et al. |
| 2003/0206839 | A1 | 11/2003 | Taylor et al. |
| 2003/0206840 | A1 | 11/2003 | Taylor et al. |
| 2004/0033176 | A1 | 2/2004 | Lee et al. |
| 2004/0052700 | A1 | 3/2004 | Kotlyar et al. |
| 2004/0065202 | A1 | 4/2004 | Gatchell et al. |
| 2004/0096376 | A1 | 5/2004 | Taylor |
| 2004/0136863 | A1 | 7/2004 | Yates et al. |
| 2004/0166037 | A1 | 8/2004 | Youdell et al. |
| 2004/0226447 | A1 | 11/2004 | Lau et al. |
| 2004/0234431 | A1 | 11/2004 | Taylor et al. |
| 2004/0237787 | A1 | 12/2004 | Reeves et al. |
| 2004/0251124 | A1 | 12/2004 | Lau |
| 2004/0251909 | A1 | 12/2004 | Taylor et al. |
| 2005/0000793 | A1 | 1/2005 | Taylor et al. |

FOREIGN PATENT DOCUMENTS

| | | | |
|---|---|---|---|
| CN | 87210843 | U | 7/1988 |
| CN | 2138764 | Y | 6/1993 |
| CN | 2153231 | Y | 12/1993 |
| DE | 2206057 | | 8/1973 |
| DE | 197 41 621 C 1 | | 6/1999 |
| EP | 0433152 | A1 | 12/1990 |
| EP | 0332624 | B1 | 1/1992 |
| FR | 2690509 | | 10/1993 |
| GB | 643363 | | 9/1950 |
| JP | S51-90077 | | 8/1976 |
| JP | S62-20653 | | 2/1987 |
| JP | S63-164948 | | 10/1988 |
| JP | 10137007 | | 5/1998 |
| JP | 11104223 | | 4/1999 |
| JP | 2000236914 | | 9/2000 |
| WO | WO 92/05875 | A1 | 4/1992 |
| WO | WO 96/04703 | A1 | 2/1996 |
| WO | WO 99/07474 | A1 | 2/1999 |
| WO | WO 00/10713 | A1 | 3/2000 |
| WO | WO 01/47803 | A1 | 7/2001 |
| WO | WO 01/48781 | A1 | 7/2001 |
| WO | WO 01/64349 | A1 | 9/2001 |
| WO | WO 01/85348 | A2 | 11/2001 |
| WO | WO 02/20162 | A2 | 3/2002 |
| WO | WO 02/20163 | A2 | 3/2002 |
| WO | WO 02/30574 | A1 | 4/2002 |
| WO | WO 02/32578 | A1 | 4/2002 |
| WO | WO 02/42003 | A2 | 5/2002 |
| WO | WO 02/066167 | A1 | 8/2002 |
| WO | WO 03/009944 | A1 | 2/2003 |
| WO | WO 03/013620 | A1 | 2/2003 |
| WO | WO 03/013734 AA | | 2/2003 |

OTHER PUBLICATIONS

U.S. Appl. No. 60/306,479, filed Jul. 18, 2001, Taylor.
U.S. Appl. No. 60/341,179, filed Dec. 13, 2001, Taylor et al.
U.S. Appl. No. 60/340,702, filed Dec. 13, 2001, Taylor et al.
U.S. Appl. No. 60/341,377, filed Dec. 13, 2001, Taylor et al.
U.S. Appl. No. 60/341,518, filed Dec. 13, 2001, Taylor.
U.S. Appl. No. 60/340,288, filed Dec. 13, 2001, Taylor.
U.S. Appl. No. 60/341,176, filed Dec. 13, 2001, Taylor.
U.S. Appl. No. 60/340,462, filed Dec. 13, 2001, Taylor.
U.S. Appl. No. 60/340,090, filed Dec. 13, 2001, Taylor.
U.S. Appl. No. 60/341,433, filed Dec. 13, 2001, Taylor.
U.S. Appl. No. 60/341,592, filed Dec. 13, 2001, Taylor.
U.S. Appl. No. 60/341,320, filed Dec. 13, 2001, Taylor.
U.S. Appl. No. 60/391,070, filed Jun. 6, 2002, Reeves.
Blueair AV 402 Air Purifier, http://www.air-purifiers-usa.biz/Blueair_AV402.htm, 4 pp., 1996.
Blueair AV 501 Air Purifier, http://www.air-purifiers-usa.biz/Blueair_AV501.htm, 15 pp., 1997.
ConsumerReports.org, "Air Cleaners: Behind the Hype," http://www.consumerreports.org/main/content/printable.jsp?FOLDER%3C%3EFOLDER_id, Oct. 2003, 6 pp.
English Translation of German Patent Document DE 197 41 621 C1; Publication Date: Jun. 10, 1999.
English Translation of Japanese Unexamined Utility Model Application No. S63-164948; Publication Date: Oct. 27, 1988.
Friedrich C-90A Electronic Air Cleaner, Service Information, Friedrich Air Conditioning Co., 12 pp., 1985.
"Household Air Cleaners," Consumer Reports Magazine, Oct. 1992, 6 pp.
LakeAir Excel and Maxum Portable Electronic Air Cleaners, Operating and Service Manual, LakeAir International, Inc., 11 pp., 1971.
LENTEK Sila™ Plug-In Air Purifier/Deodorizer product box copyrighted 1999, 13 pages.
Promotional material available from Zenion Industries for the Plasma-Pure 100/200/300, 2 pages, Aug. 1990.
Promotional material available from Zenion Industries for the Plasma-Tron, 2 pages, Aug. 1990.
Trion 120 Air Purifier, Model 442501-025, http://www.feddersoutled.com/trion120.html, 16 pp., believed to be at least one year prior to Nov. 5, 1998.
Trion 150 Air Purifier, Model 45000-002, http://www.feddersoutlet.com/trion150.html, 11 pp., believed to be at least one year prior to Nov. 5, 1998.
Trion 350 Air Purifier, Model 450111-010, http://www.feddersoutlet.com/trion350.html, 12 pp., believed to be at least one year prior to Nov. 5, 1998.
Trion Console 250 Electronic Air Cleaner, Model Series 442857 and 445600, Manual for Installation-Operation-Maintenance, Trion Inc., 7 pp., believed to be at least one year prior to Nov. 5, 1998.

* cited by examiner

ELECTRO-KINETIC AIR TRANSPORTER AND CONDITIONER DEVICES WITH 3/2 CONFIGURATION HAVING DRIVER ELECTRODES

PRIORITY CLAIM

The present application is a continuation of application entitled "ELECTRO-KINETIC AIR TRANSPORTER-CONDITIONER DEVICES WITH INSULATED DRIVER ELECTRODES" application Ser. No. 10/717,420, now abandoned filed Nov. 19, 2003 which claims priority under 35 U.S.C. 119(e) to U.S. Provisional Patent Application No. 60/500,437, filed Sep. 5, 2003, entitled "ELECTRO-KINETIC AIR TRANSPORTER-CONDITIONER DEVICES WITH INSULATED DRIVER ELECTRODES" both of which are hereby incorporated herein by reference.

CROSS-REFERENCE TO RELATED ART

The present invention is related to the following patent applications and patent, each of which is incorporated herein by reference: abandoned U.S. patent application Ser. No. 10/074,207, filed Feb. 12, 2002, entitled "Electro-Kinetic Air Transporter Conditioner Devices with Interstitial Electrode"; abandoned U.S. patent application Ser. No. 10/074,827, filed Feb. 12, 2002, "Electro-Kinetic Air Transporter-Conditioner with Non-Equidistant Collector Electrodes"; and U.S. Pat. No. 6,176,977, entitled "Electro-Kinetic Air Transporter-Conditioner."

FIELD OF THE INVENTION

The present invention relates generally to devices that electro-kinetically transport and/or condition air.

BACKGROUND OF THE INVENTION

It is known in the art to produce an airflow using electro-kinetic techniques, by which electrical power is converted into a flow of air without mechanically moving components. One such system was described in U.S. Pat. No. 4,789,801 to Lee (1988), depicted herein in simplified form as FIG. 1. System 100 includes a first array 110 of emitter electrodes 112 that are spaced-apart symmetrically from a second array 120 of collector electrodes 122. The positive terminal of a high voltage pulse generator 140 that outputs a train of high voltage pulses (e.g., 0 to perhaps +5 KV) is coupled to the first array 110, and the negative pulse generator terminal is coupled to the second array 120 in this example.

The high voltage pulses ionize the air between arrays 110 and 120, and create an airflow 150 from the first array 110 toward the second array 120, without requiring any moving parts. Particulate matter 160 in the air is entrained within the airflow 150 and also moves towards the collector electrodes 122. Some of the particulate matter is electrostatically attracted to the surfaces of the collector electrodes 122, where it remains, thus conditioning the flow of air exiting system 100. Further, the corona discharge produced between the electrode arrays can release ozone into the ambient environment, which can eliminate odors that are entrained in the airflow, but is generally undesirable in excess quantities.

In a further embodiment of Lee shown herein as FIG. 2, a third array 230 includes passive collector electrodes 232 that are positioned midway between each pair of collector electrodes 122. According to Lee, these passive collector electrodes 232, which were described as being grounded, increase precipitation efficiency. However, because the grounded passive collector electrodes 232 (also referred to hereafter as driver electrodes) are located close to adjacent negatively charged collector electrodes 122, undesirable arcing (also known as breakdown or sparking) will occur between collector electrodes 122 and driver electrodes 232 if the potential difference therebetween is too high, or if a carbon path is produced between an electrode 122 and an electrode 232 (e.g., due to a moth or other insect that got stuck between an electrode 122 and electrode 232). It is also noted that driver electrodes are sometimes referred to as interstitial electrodes because they are situated between other (i.e., collector) electrodes.

Increasing the voltage difference between the emitter electrodes 112 and the collector electrodes 122 is one way to further increase particle collecting efficiency and air flow rate. However, the extent that the voltage difference can be increased is limited because arcing will eventually occur between the collector electrodes 122 and the driver electrodes 232. Such arcing will typically decrease the collecting efficiency of the system, as well as produce an unpleasant odor.

Accordingly, there is a desire to improve upon existing electro-kinetic techniques. More specifically there is a desire to increase particle collecting efficiency and airflow rate, and to reduce arcing between electrodes.

SUMMARY OF THE PRESENT INVENTION

Embodiments of the present invention are related to electro-kinetic air transporter-conditioner systems and methods. In accordance with an embodiment of the present invention, a system includes at least one emitter electrode and at least one collector electrode that is downstream from the emitter electrode. An insulated driver electrode is located adjacent the collector electrode. A high voltage source provides a voltage potential to at least one of the emitter electrode and the collector electrode to thereby provide a potential different therebetween. The insulated driver electrode(s) may or may not be at a same voltage potential as the emitter electrode, but should be at a different voltage potential than the collector electrode.

The insulation (i.e., dielectric material) on the driver electrodes allows the voltage potential to be increased between the driver and collector electrodes, to a voltage potential that would otherwise cause arcing if the insulation were not present. This increased voltage potential increases particle collection efficiency. Additionally, the insulation will reduce, and likely prevent, any arcing from occurring if a carbon path is formed between the collector and driver electrodes, e.g., due to an insect getting caught therebetween.

In accordance with an embodiment of the present invention, the emitter electrode(s) and the insulated driver electrode(s) are grounded, while the high voltage source is used to provide a high voltage potential to the collector electrode(s) (e.g., −16 KV). This is a relatively easy embodiment to implement since the high voltage source need only provide one polarity.

In accordance with an embodiment of the present invention, the emitter electrode(s) is at a first voltage potential, the collector electrode(s) is at a second voltage potential different than the first voltage potential, and the insulated driver electrode is at a third voltage potential different than the first and second voltage potentials. One of the first, second and third voltage potentials can be ground, but need not be. Other variations, such as the emitter and driver electrodes being at the same potential (ground or otherwise) are within the scope of the invention.

In accordance with an embodiment of the present invention, the emitter electrode(s) may be generally equidistant from the upstream ends of the closest pair of collector electrodes. In other embodiments, certain emitter electrodes are moved outward to thereby adjust the electric fields produced between the emitter electrodes and the collector electrodes, and thus establish a non-equidistant relationship.

In accordance with an embodiment of the present invention, an the upstream end of each insulated driver electrode is set back a distance from the upstream end of the collector electrode(s).

Each insulated driver electrode includes an underlying electrically conductive electrode that is covered with, for example, a dielectric material. The dielectric material can be, for example, a heat shrink tubing material or an insulating varnish type material. In accordance with an embodiment of the present invention, the dielectric material is coated with an ozone reducing catalyst. In accordance with another embodiment of the present invention, the dielectric material includes or is an ozone reducing catalyst.

The embodiments as describe above have some or all of the advantages of increasing the particle collection efficiency, increasing the rate and/or volume of airflow, reducing arcing, and/or reducing the amount of ozone generated. Further, ions generated using many of the embodiments of the present invention will be more of the negative variety as opposed to the positive variety.

In accordance with an embodiment of the present invention, an insulated driver electrode includes generally flat elongated sides that are generally parallel with the adjacent collector electrode(s). Alternatively, an insulated driver electrode can include one, or preferably a row of, insulated wire-shaped electrodes.

Other features and advantages of the invention will appear from the following description in which the preferred embodiments have been set forth in detail, in conjunction with the accompanying drawings and claims.

BRIEF DESCRIPTION OF THE FIGURES

FIG. 12 illustrates schematically, an electro-kinetic conditioner system according to an embodiment of the present invention, where the insulated driver electrodes are wire-like.

DETAILED DESCRIPTION

Figure 1:
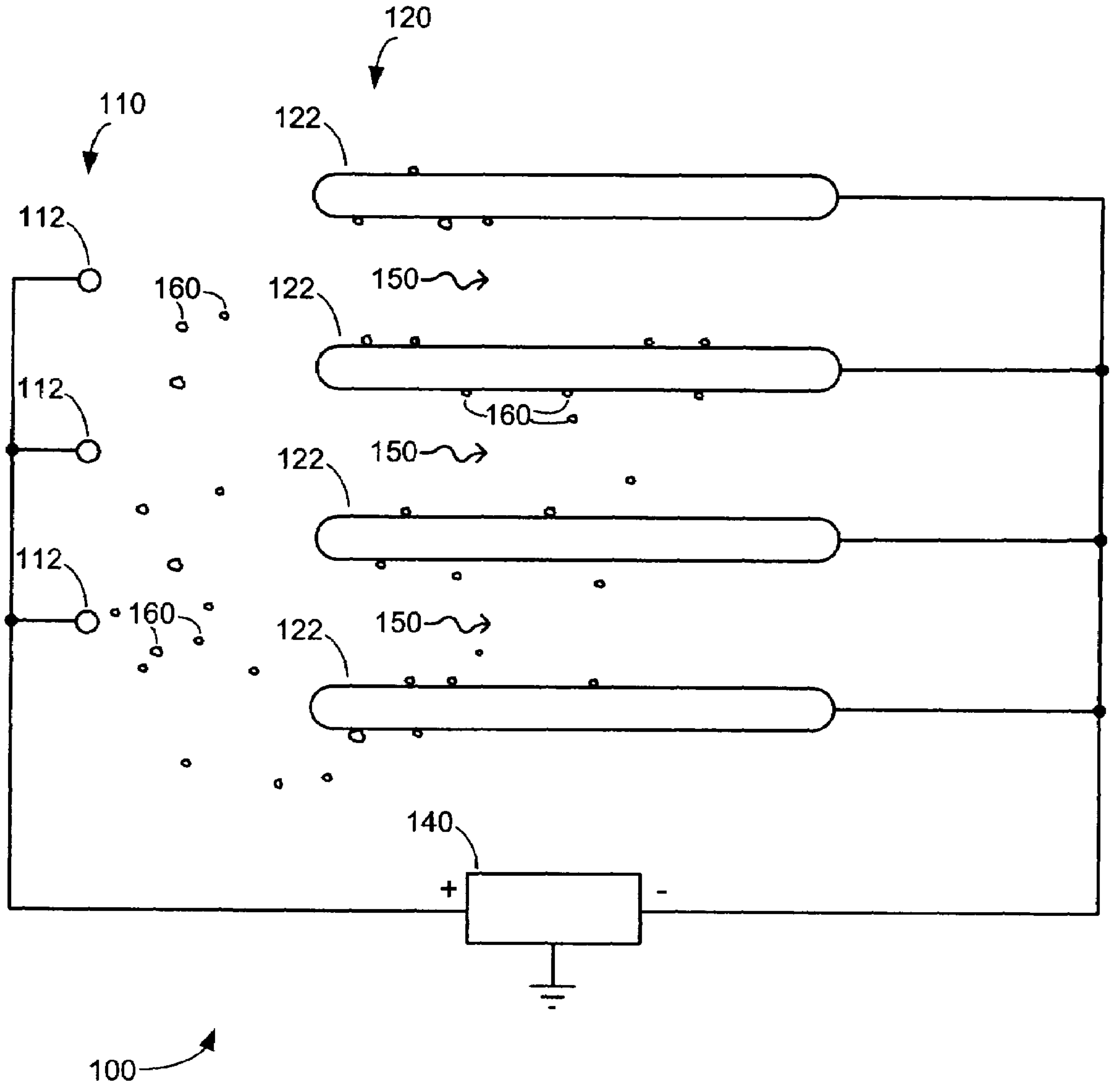
FIG. 1 (PRIOR ART)
FIG. 1 illustrates schematically, a prior art electro-kinetic conditioner system.
Figure 2:
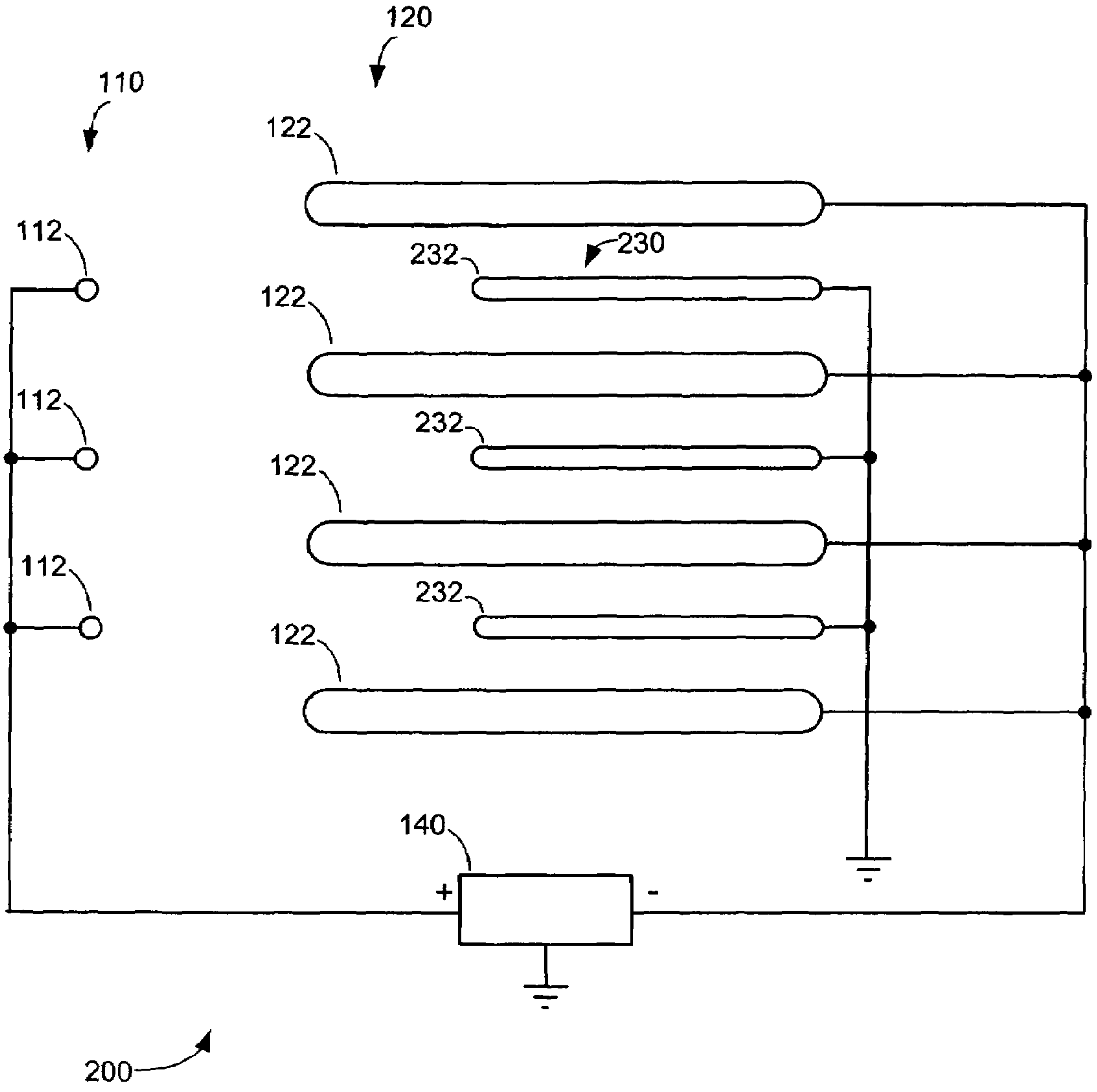
FIG. 2 (PRIOR ART)
FIG. 2 illustrates schematically, a further prior art electro-kinetic conditioner system.
Figure 3:
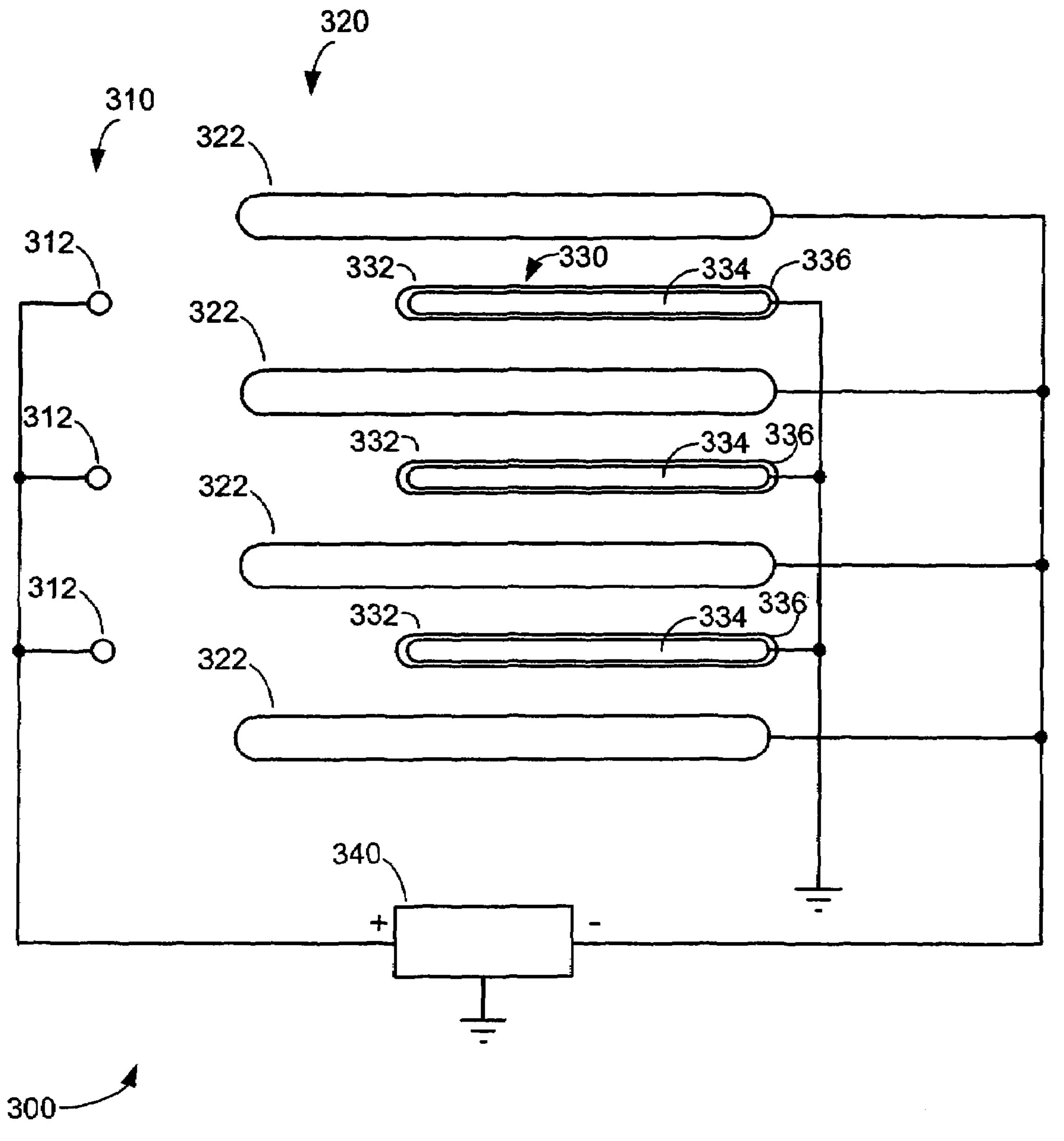
FIG. 3 illustrates schematically, an electro-kinetic conditioner system according to an embodiment of the present invention.

FIG. 3 illustrates schematically, an electro-kinetic conditioner system 300 according to an embodiment of the present invention. The system includes a first array 310 (i.e., emitter array) of emitter electrodes 312, a second array 320 (i.e. collector array) of collector electrodes 322 and a third array 330 of insulated driver electrodes 330. In this embodiment, the first array 310 is shown as being connected to a positive terminal of a high voltage source 340, and the second array 320 is shown as being connected to a negative terminal of the high voltage source 340. The third array 330 of insulated driver electrodes 332 are shown as being grounded.

Each insulated driver electrode 332 includes an electrically conductive electrode 334 that is covered by a dielectric material 336. In accordance with an embodiment of the present invention, the dielectric material 336 is heat shrink tubing. During manufacture, the heat shrink tubing is placed over the driver electrodes 334 and then heated, which causes the tubing to shrink to the shape of the driver electrodes 334. An exemplary heat shrinkable tubing is type FP-301 flexible polyolefin tubing available from 3M of St. Paul, Minn.

In accordance with another embodiment of the present invention, the dielectric material 336 is an insulating varnish, lacquer or resin. For example, a varnish, after being applied to the surface of the driver electrodes 334, dries and forms an insulating coat or film a few mil (thousands of an inch) in thickness covering the electrodes 334. The dielectric strength of the varnish or lacquer can be, for example, above 1000 V/mil (one thousands of an inch). Such insulating varnishes, lacquer and resins are commercially available from various sources, such as from John C. Dolph Company of Monmouth Junction, N.J., and Ranbar Electrical Materials Inc. of Manor, Pa.

Other possible dielectric materials that can be used to insulate the driver electrodes include ceramic or porcelain enamel or fiberglass. These are just a few examples of dielectric materials that can be used to insulate the driver electrodes 334. It is within the spirit and scope of the present invention that other insulating dielectric materials can be used to insulate the driver electrodes.

During operation of system 300, the high voltage source 340 positively charges the emitter electrodes 312 (of the first array 310) and negatively charges the collector electrodes 322

(of the second array 320). For example, the voltage on the emitter electrodes 312 can be +6 KV, while the voltage on the collector electrodes 322 can be −10 KV, resulting in a 16 KV potential difference between the emitter electrodes 312 and collector electrodes 322. This potential difference will produces a high intensity electric field that is highly concentrated around the emitter electrodes 312. More specifically, a corona discharge takes place from the emitter electrodes 312 to the collector electrodes 322, producing positively charged ions. Particles (e.g., dust particles) in the vicinity of the emitter electrodes 312 are positively charged by the ions. The positively charged ions are repelled by the positively charged emitter electrodes 312, and are attracted to and deposited on the negatively charged collector electrodes 322.

Further electric fields are produced between the insulates driver electrodes 332 and collector electrodes 322, which further push the positively charged particles toward the collector electrodes 322. Generally, the greater this electric field between the driver electrodes and collector electrodes, the greater the particle collection efficiency. In the prior art, the extent that this voltage difference (and thus, the electric field) could be increased was limited because arcing would occur between the collector electrodes and un-insulated driver electrodes beyond a certain voltage potential difference. However, with the present invention, the insulation 336 covering electrodes 334 significantly increases the voltage potential difference that can be obtained between the collector electrodes 322 and the driver electrodes 332 without arcing. The increased potential difference results in an increase electric field, which significantly increases particle collecting efficiency. By analogy, the insulation 336 works much the same way as a dielectric material works in a parallel plate capacitor. That is, even though a parallel plate capacitor can be created with only an air gap between a pair of differently charged conductive plates, the electric field can be significantly increased by placing a dielectric material between the plates.

As will be described in further detail below, a system such as system 300 will likely be included within a freestanding housing the is meant to be placed in a room (e.g., near a corner of a room) to thereby clean the air in the room, circulate the air in the room, and increase the concentration of negative ions in the room. Such a housing will likely include a side having one or more inlet vents and an opposing side having one or more outlet vents, with the side having the outlet vent(s) intended not to face any wall. Thus, the side of the housing having the inlet vent(s) will often be placed close to wall. Accordingly, it is likely that the positively charged emitter electrodes 312 will be in close proximity to the floor and/or wall(s) of a room. The floor or walls of a room can generally be thought of as having a grounded voltage potential. Accordingly, with system 300 there will be a potential difference, and thus electric field, between the positively charge emitter electrodes 312 and any nearby floor and/or wall(s), or even furniture, in a room. The effect of this is that a portion of the positively charged ions (and positively charge particles) produced in the vicinity of the emitter electrodes 312 may travel backward, i.e., in a direction opposite or away from the collector electrodes 322. This can cause the undesirable effects of reducing cleaning efficiency, increasing positive ions in a room, and causing particles to stick to the floor and/or walls in the room. Many of the following embodiments of the present invention overcome these just mentioned deficiencies.

Figure 4:
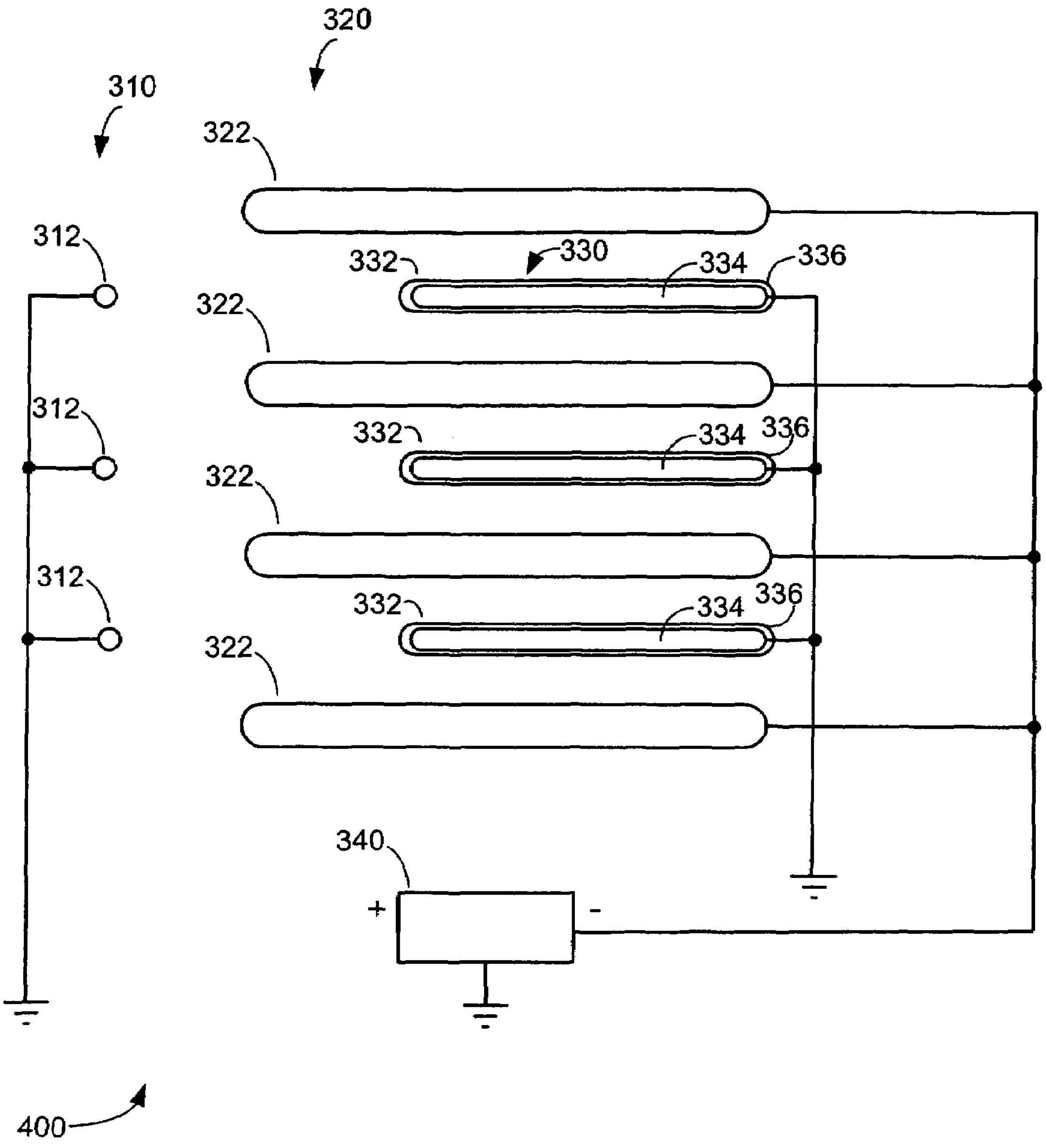
FIG. 4 illustrates schematically, an electro-kinetic conditioner system according to another embodiment of the present invention.

FIG. 4 illustrates schematically, an electro-kinetic conditioner system 400 according to another embodiment of the present invention. The arrangement of system 400 is similar to that of system 300 (and thus, is numbered in the same manner), except that the emitter electrodes 312 are grounded in system 400, rather than being connected to the positive output terminal of a high voltage source 340. The collector electrodes 322 are still negatively charged. Further, the insulated driver electrodes 332 are still grounded.

The electro-kinetic conditioner system 400 operates in a similar manner to system 300. More specifically, during operation of system 400, the high voltage source 340 negatively charges the collector electrodes 322 (of the collector array 320). For example, the voltage on the collector electrodes 322 can be −16 KV, resulting in a 16 KV potential difference between the grounded emitter electrodes 312 and the collector electrodes 322. This potential difference will produces a high intensity electric field that is highly concentrated around the emitter electrodes 312. More specifically, a corona discharge takes place from the emitter electrodes 312 to the collector electrodes 322, producing positive ions. This causes particles (e.g., dust particles) in the vicinity of the emitter electrodes 312 become positively charged relative to the collector electrodes 322. The particles are attracted to and deposited on the negatively charged collector electrodes 322. Additionally, there will be a 16 KV potential difference between the insulated driver electrodes 332 and the collector electrodes 322, which pushes particles toward the collector electrodes 322. Advantageously, in this embodiment the emitter electrodes 312 will be generally at the same potential as the floor and walls of a room within which system 400 is placed. This will significantly reduce, and possibly prevent, any charged particles from flowing backward, i.e., away from the collector electrodes.

Another advantage of system 400 is that it requires only a single polarity voltage supply (e.g., voltage source 340 need only provide a −16 KV potential, without requiring any positive supply potential). Thus, system 400 is relatively simple to design, build and manufacture, making it a very cost effective system.

Figure 5:
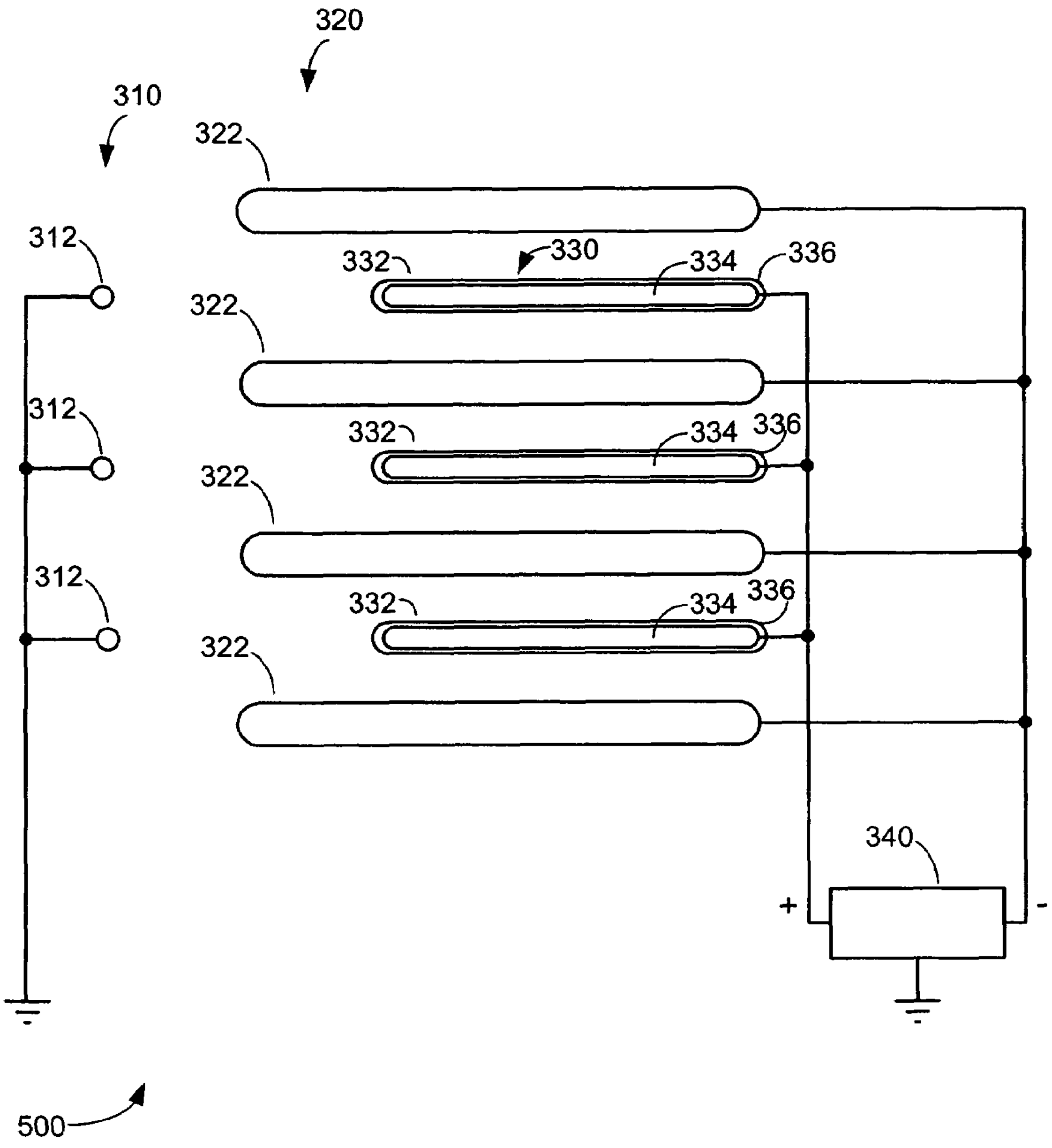
FIG. 5 illustrates schematically, an electro-kinetic conditioner system according to a further embodiment of the present invention.

FIG. 5 illustrates schematically, an electro-kinetic conditioner system 500 according to another embodiment of the present invention. The arrangement of system 500 is similar to that of system 400 (and thus, is numbered in the same manner), except that the insulated driver electrodes 332 are connected to the positive output terminal of the high voltage source 340, rather than being grounded as in system 300. The collector electrodes 322 are still negatively charged. Further, the emitter electrodes 312 are still grounded. Positively charging the insulated drivers 332 can be used to increase the potential difference between the insulated driver array 330 and the collector array 320, thereby increasing the particle collecting efficiency. For example, the voltage on the collector electrodes 322 can be −16 KV, while the voltage on the insulated drivers 332 can be +5 KV, resulting in a 21 KV potential difference between the collector electrodes 322 and the insulated driver electrodes 332, while keeping the voltage potential difference between the emitter electrodes 312 and collector electrodes 322 at 16 KV.

The electro-kinetic conditioner system 500 operates in a similar manner to system 400. Advantageously, as in system 400, in this embodiment the emitter electrodes 312 will be generally at the same potential as the floor and walls of a room within which system 500 is placed, which will significantly reduce, and possibly prevent, any charged particles from flowing backward, i.e., away from the collector electrodes 322. While system 500 will be quite effective, it will require a slightly more complex voltage source 340, since voltage source 340 must provide both a positive and negative voltage potential.

In addition to those described above, there are other voltage potential variations that can be used to drive an electro-kinetic system including an insulated driver electrode(s) 332. To summarize, in system 300 shown in FIG. 3, the emitter electrodes 312 were positive, the collector electrodes 322 were negative, and the insulated driver electrodes 332 were grounded. In system 400 shown in FIG. 4, the emitter electrodes 312 and the insulated driver electrodes 332 were grounded, and the collector electrodes 322 were negative. It would also be possible to modify the system 400 to make the insulated driver electrodes 332 slightly negative (e.g., −1 KV) so long as the collector electrodes 322 were significantly more negative (e.g., −16 KV). In system 400, the emitter electrodes 312 were grounded, the collector electrodes 322 were negative, and the insulated driver electrodes 332 were positive. System 400 can be modified, for example, by making the emitter electrodes 312 slightly negative or slightly positive. Other variations are also possible while still being within the spirit as scope of the present invention. For example, the emitter electrodes 312 and insulated driver electrodes 332 can be grounded, while the collector electrodes 322 have a high negative voltage potential or a high positive voltage potential. It is also possible that the instead of grounding certain portions of the electrode arrangement, the entire arrangement can float (e.g., the insulated driver electrodes 332 and the emitter electrodes 312 can be at a floating voltage potential, with the collector electrodes 322 offset from the floating voltage potential).

An important feature according to an embodiment of the present invention is that, if desired, the voltage potential of the emitter electrodes 312 and insulated driver electrodes 332 can be independently adjusted. This allows for corona current adjustment (produced by the electric field between the emitter electrodes 312 and collector electrodes 322) to be performed independently of the adjustments to the electric fields between the insulated driver electrodes 332 and collector electrodes 322. More specifically, this allows the voltage potential between the emitter electrodes 312 and collector electrodes 322 to be kept below arcing levels, while still being able to independently increase the voltage potential between the insulated driver electrodes 332 and collector electrodes 322 to a higher voltage potential difference than would be possible between the emitters 312 and collectors 322.

Figure 6:
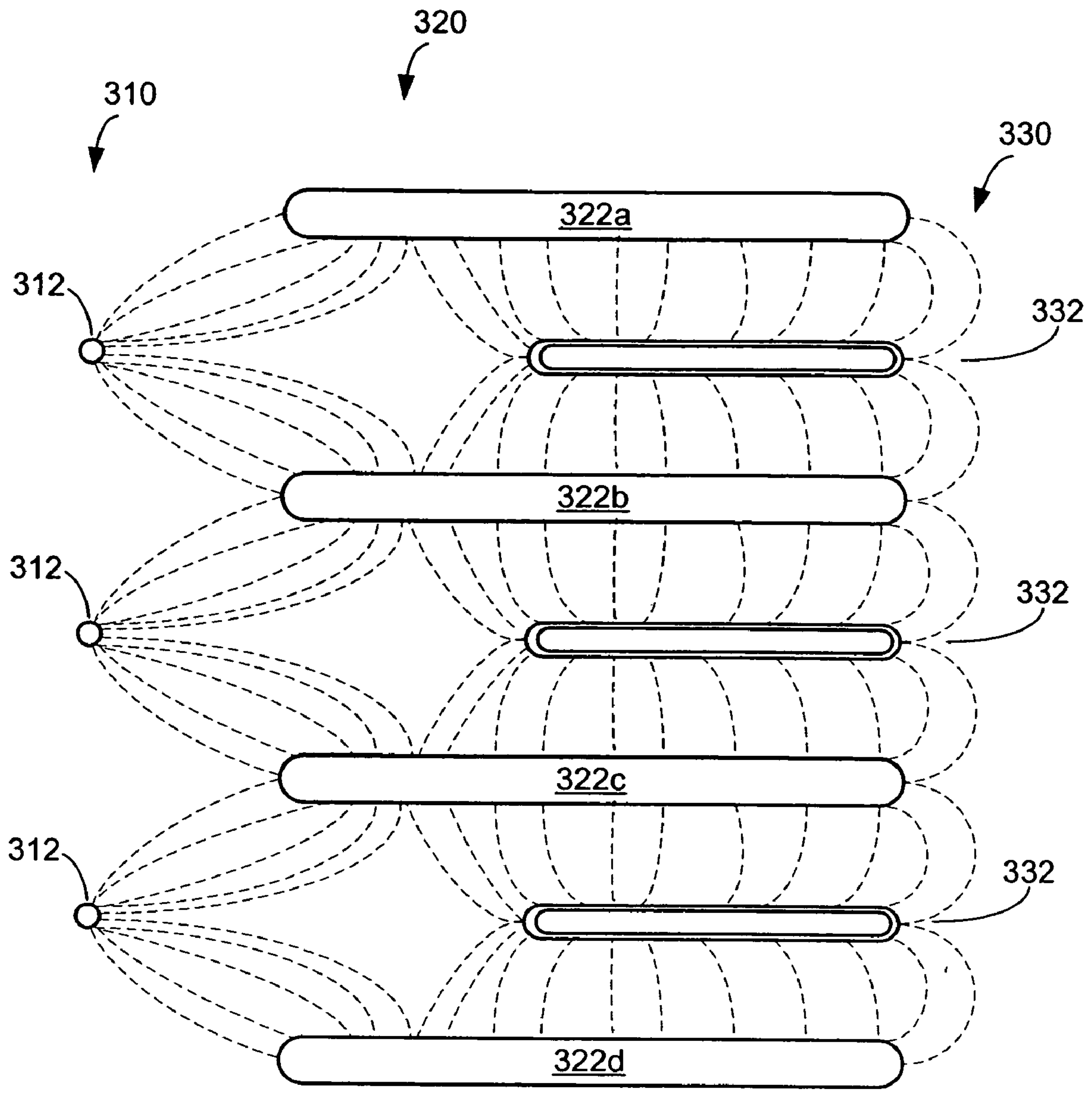
FIG. 6 illustrates exemplary electrostatic field lines produced using embodiments of the present invention.

The electric fields produced between the emitter electrodes 312 and collector electrodes 322 (also referred to as the ionization regions), and the electric fields produced between the insulated driver electrodes 332 and collector electrodes 322 (also referred to as the collector regions), are show as exemplary dashed lines in FIG. 6. The ionization regions produce ions and cause air movement in a downstream direction from the emitter electrodes 312 toward the collector electrodes 322. The collector regions increase particle capture by pushing charged particles in the air flow toward the collector electrodes 322.

Figure 7:
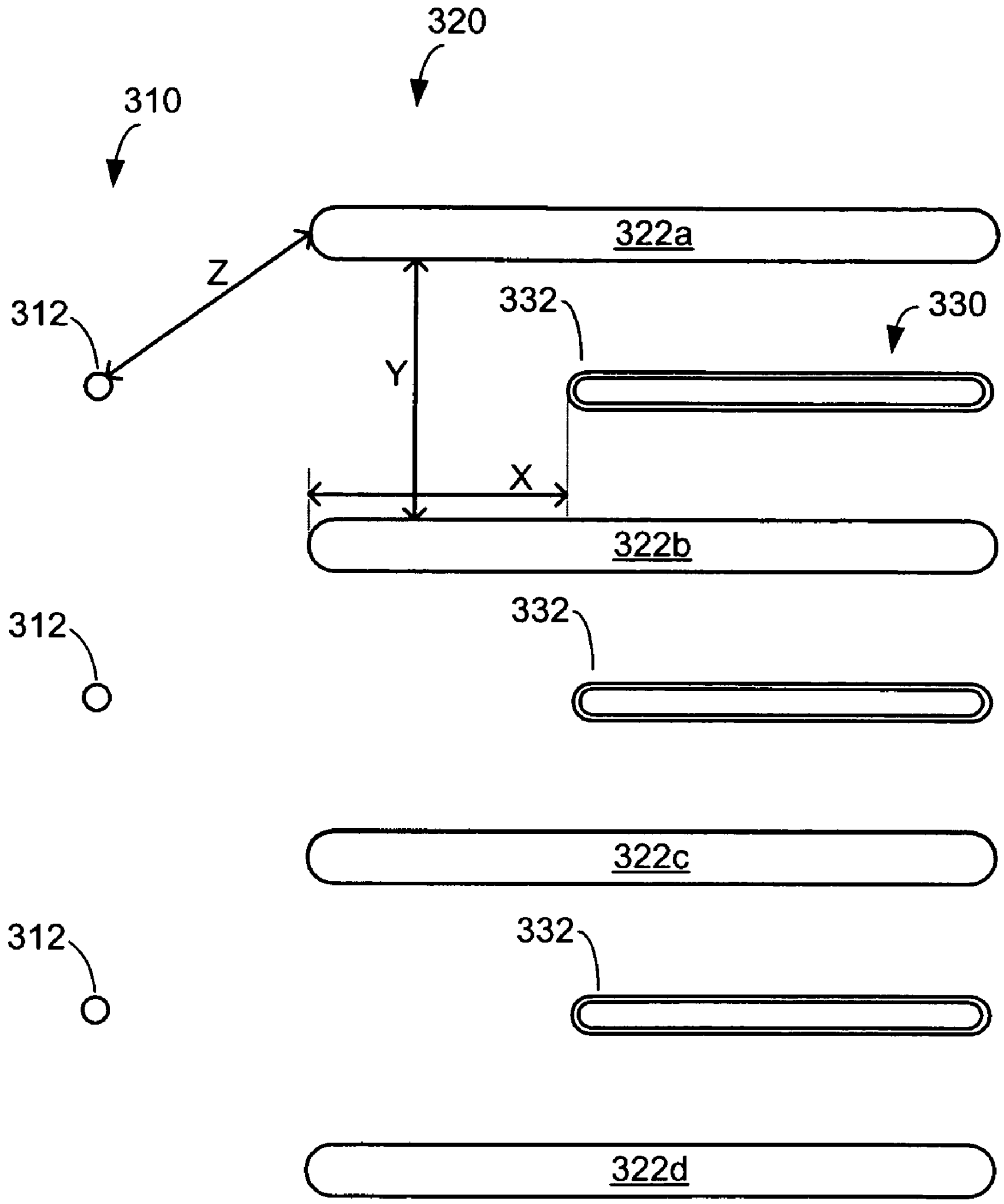
FIG. 7 illustrates the relative distances between various electrodes of the electro-kinetic conditioner systems of the present invention.

It is preferably that the electric fields produced between the insulated driver electrode(s) 332 and collector electrodes 322 (i.e. the collecting regions) do not interfere with the electric fields between the emitter electrode(s) 312 and the collector electrodes 322 (i.e., the ionization regions). If this were to occur, the collecting regions will reduce the intensity of the ionization regions, thereby reducing the production of ions and slowing down air movement. Accordingly, the leading ends of the driver electrodes 332 are preferably set back (i.e., downstream) from the leading ends of the collector electrodes 322 by about the same distance that the emitter electrodes 312 are from the collector electrodes 322. This is shown in FIG. 7, where the setback distance X of an insulated driver electrodes 332 is approximately equal to the distance Z between an emitter electrode 312 and the closest collector electrodes 322. Still referring to FIG. 7, it is also desirable to have the distance Y between a pair of adjacent emitter electrodes 312 about equal to the setback distance X. However, other set back distances are within the spirit and scope of the present invention.

As explained above, the emitter electrodes 312 and insulated driver electrodes 332 may or may not be at the same voltage potential, depending on which embodiment of the present invention is practiced. When at the same voltage potential, there will be no problem of arcing occurring between the emitter electrodes 312 and insulated driver electrodes 332. Further, even when at different potentials, because the insulated driver electrodes 332 are setback as described above, the collector electrodes 322 will shield the insulated driver electrodes 332, as can be appreciated from the electric field lines shown in FIG. 6. Thus, as shown in FIG. 6, there is generally no electric field produced between the emitter electrodes 312 and the insulated driver electrodes 332. Accordingly, arcing should not occur therebetween.

Figure 8:
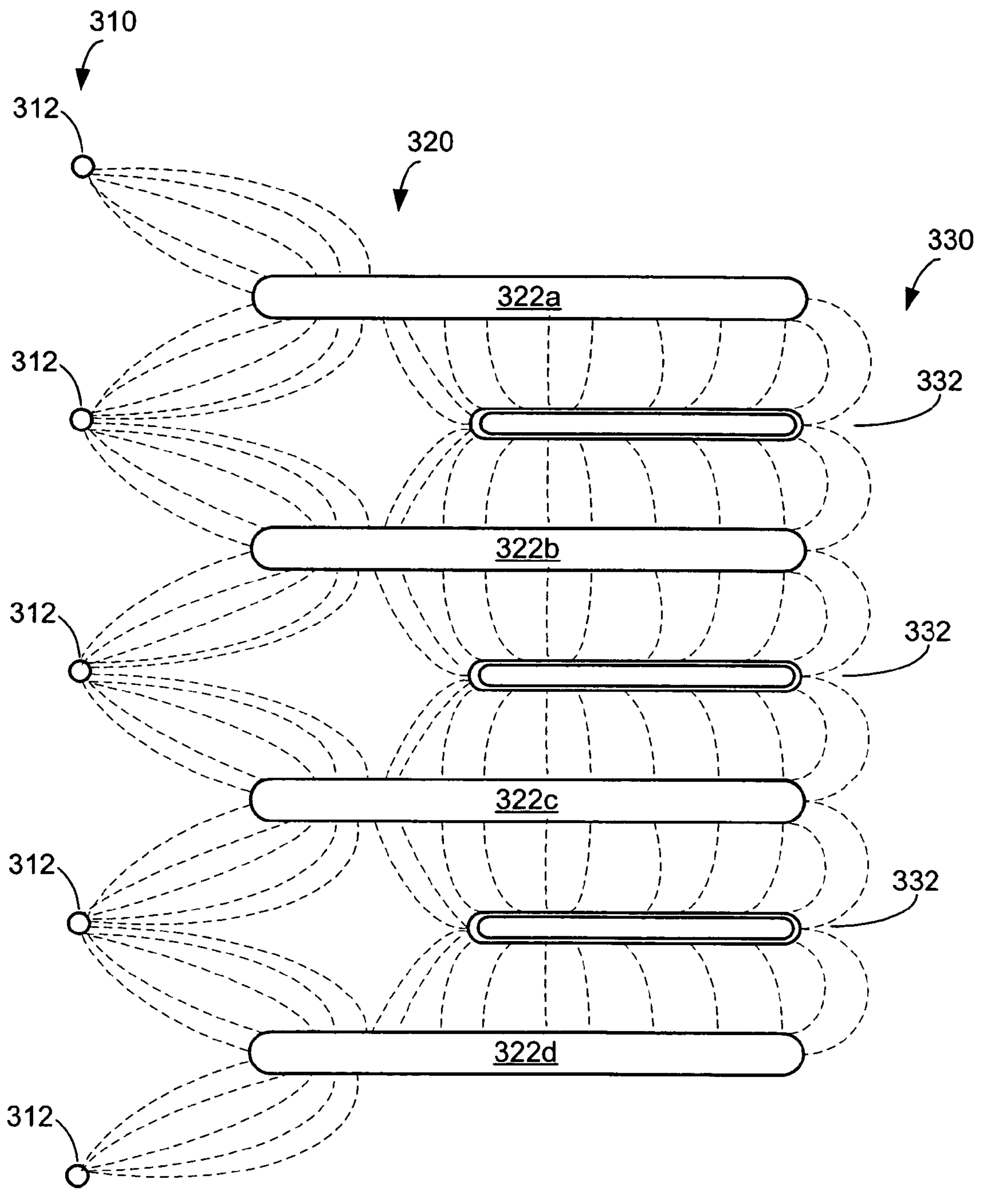
FIG. 8 illustrates schematically, an electro-kinetic conditioner system according to a further embodiment of the present invention where additional emitter electrodes are used.

Referring back to FIG. 6, it can be appreciated that the outermost surfaces of the outer collector electrodes **322*a* and 322*d* are farthest from any of the emitter electrodes 312, resulting in a lower electric field at these surfaces. This will reduce the particle collecting efficiency of the outermost surfaces of the outer collector electrodes 322*a* and 322*d*. To increase the electric field at these surfaces, and thus the particle collection efficiency, two extra emitter electrodes can be added in accordance with an embodiment of the present invention, as shown in FIG. 8**. While the extra emitters will increase particle collection efficiency, they may also add to the overall size of the system, potentially increase ozone production, and increase the power consumption of the system.

Figure 9:
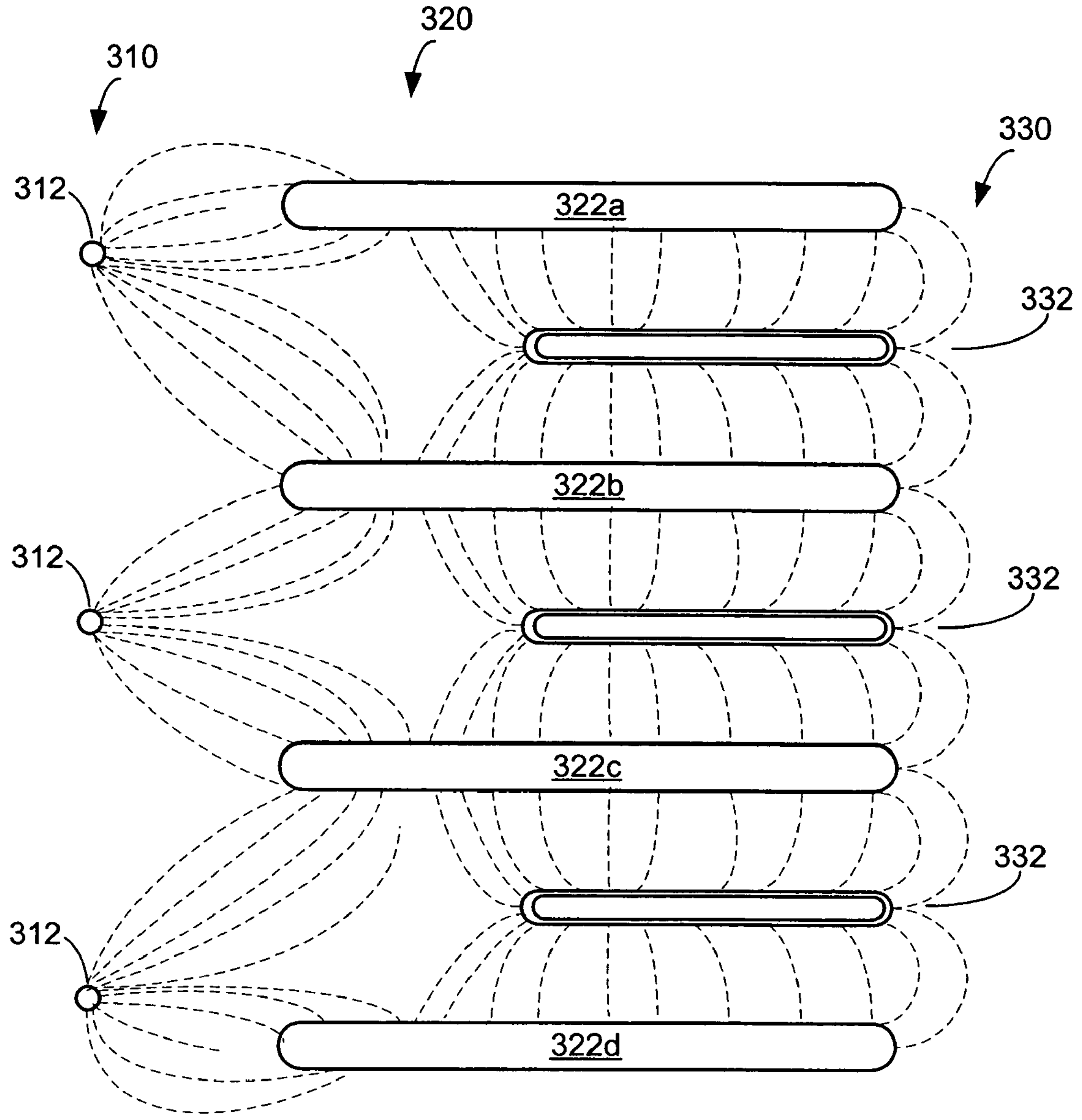
FIG. 9 illustrates schematically, an electro-kinetic conditioner system according to an embodiment of the present invention, where the location of the emitter electrodes are adjusted to change the electric field distribution.

An scheme for producing a more uniform airflow, is to move the outer emitter electrodes outward, as shown in FIG. 9.

Figure 10:
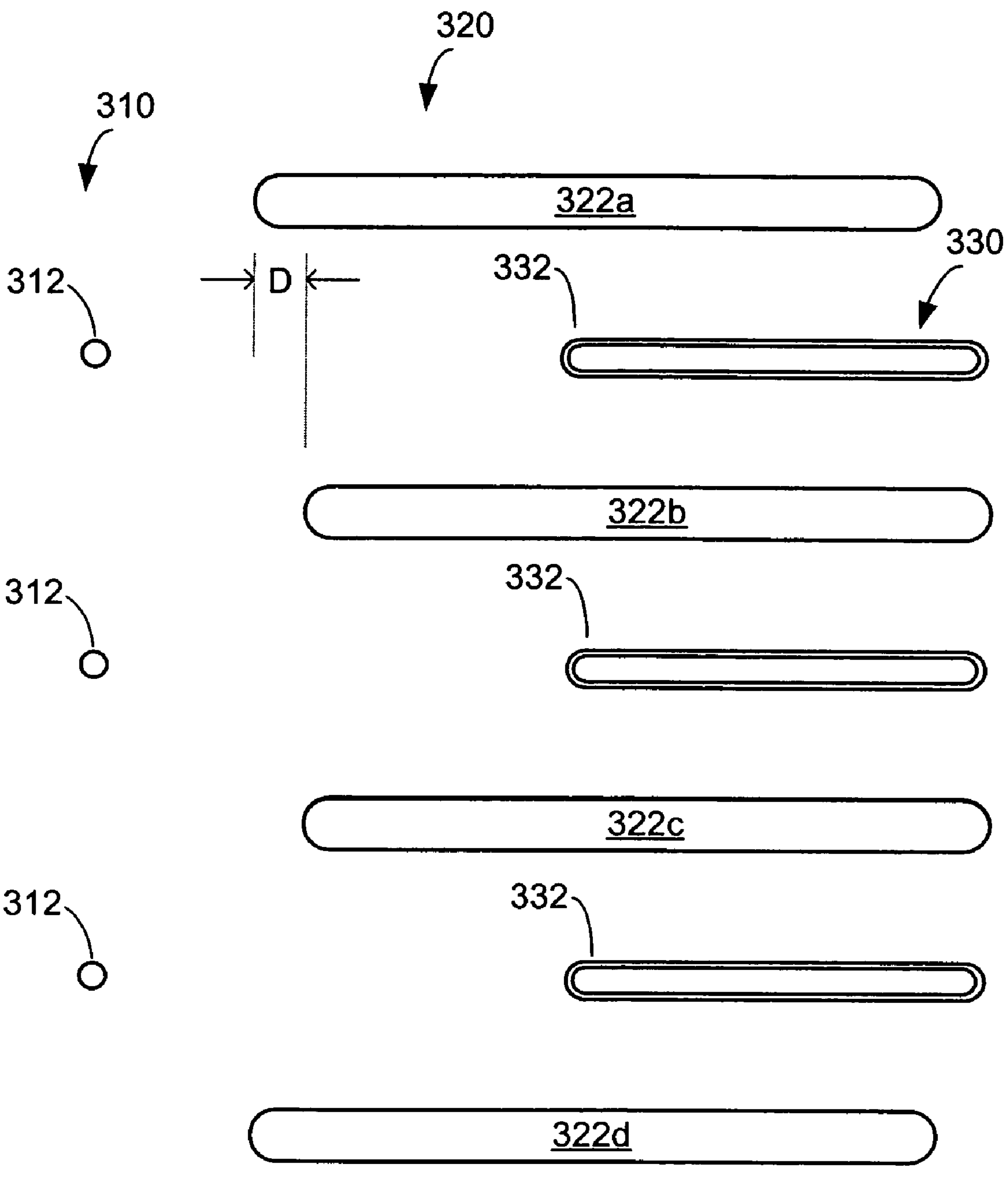
FIG. 10 illustrates schematically, an electro-kinetic conditioner system according to an embodiment of the present invention, where the location of the collector electrodes are adjusted to change the electric field distribution.

Referring back to FIG. 6, it can be appreciated that the strength of the electric field generated at the leading or upstream ends of the inner most collector electrodes **322*b* and 322*c* (i.e., the ends closest to the emitter electrodes 312) will be greater than the electric field generated at the leading ends of the outer most collector electrodes 322*a* and 322*d*. This may cause a greater amount of airflow movement in the middle of collector array 320 (i.e., near collector electrode 322*b* and 322*c*), as compared to near the outer collector electrodes 322*a* and 322*d*. If a more even airflow is desired, the inner collector electrodes 322*b* and 322*c* can be moved slightly downstream, as shown in FIG. 10**.

In addition to producing ions, the systems described above will also produce ozone ($O_3$). While limited amounts of ozone are useful for eliminating odors, concentrations of ozone beyond recommended levels are generally undesirable. In accordance with embodiments of the present invention, ozone production is reduced by coating the insulated driver electrodes 332 with an ozone reducing catalyst. Exemplary ozone reducing catalysts include manganese dioxide and activated carbon. Commercially available ozone reducing catalysts such as PremAir™ manufactured by Englehard Corporation of Iselin, N.J., can also be used.

Some ozone reducing catalysts, such as manganese dioxide are not electrically conductive, while others, such as activated carbon are electrically conductive. When using a catalyst that is not electrically conductive, the insulation 334 can be coated in any available manner because the catalyst will act as an additional insulator, and thus not defeat the purpose of adding the insulator 334. However, when using a catalyst that is electrically conductive, it is important that the electrically conductive catalyst does not interfere with the benefits of insulating the driver. This will be described with reference to FIG. 11

Figure 11:
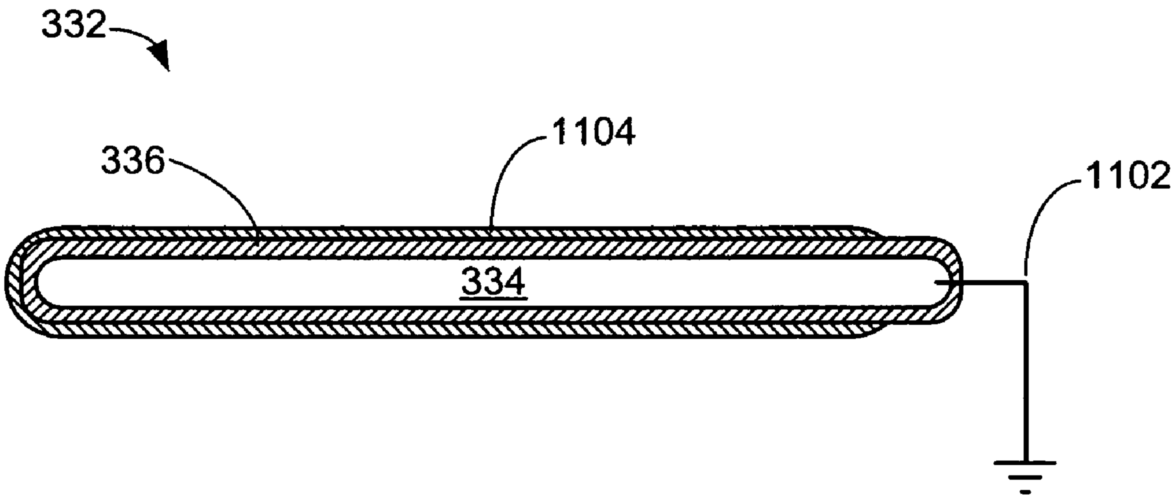
FIG. 11 illustrates the use of a ozone reducing catalyst over the insulation of the insulating driver electrodes of the present invention.

Referring now to FIG. 11, an underlying driver electrode 334 is covered by dielectric insulation 336 to produce an insulated driver electrode 332. The underlying driver electrode 334 is shown as being connected by a wire 1102 (or other conductor) to a voltage potential (ground in this example). An ozone reducing catalyst 1104 covers most of the insulation 336. If the ozone reducing catalyst does not conduct electricity, then the ozone reducing catalyst 1104 may contact the wire or other conductor 1102 without negating the advantages provided by insulating the underlying driver electrodes 334. However, if the ozone reducing catalyst 1104 is electrically conductive, then care must be taken so that the electrically conductive ozone reducing catalyst 1104 (covering the insulation 336) does not touch the wire or other conductor 1102 that connects the underlying driver electrode 334 to a voltage potential (e.g., ground, a positive voltage, or a negative voltage). So long as an electrically conductive ozone reducing catalyst does not touch the wire 1104 that connects the driver electrode 334 to a voltage potential, then the potential of the electrically conductive ozone reducing catalyst will remain floating, thereby still allowing an increased voltage potential between insulated driver electrode 332 and adjacent collector electrodes 322. Other example of electrically conductive ozone reducing catalyst include, but are not limited to, noble metals.

In accordance with another embodiment of the present invention, if the ozone reducing catalyst is not electrically conductive, then the ozone reducing catalyst can be included in, or used as, the insulation 336. Preferably the ozone reducing catalysts should have a dielectric strength of at least 1000 V/mil (one-hundredth of an inch) in this embodiment.

The positively charged particles that travel from the regions near the emitter electrodes 312 toward the collector electrodes 322 are missing electrons. In order to clean the air, it is desirable that the particles stick to the collector electrodes 322 (which can later be cleaned). Accordingly, it is desirable that the exposed surfaces of the collector electrodes 322 are electrically conductive so that the collector electrodes 322 can give up a charge (i.e., an electron), thereby causing the particles to stick to the collector electrodes 322. Accordingly, if an ozone reducing catalyst is electrically conductive, the collector electrodes 322 can be coated with the catalyst. However, it is preferably to coat the insulated driver electrodes 332 with an ozone reducing catalyst, rather than the collector electrodes 322. This is because as particles collect on the collector electrodes 322, the surfaces of the collector electrodes 322 become covered with the particles, thereby reducing the effectiveness of the ozone reducing catalyst. The insulated driver electrodes 332, on the other hand, do not collect particles. Thus, the ozone reducing effectiveness of a catalyst coating the insulated driver electrodes 332 will not diminish due to being covered by particles.

Figure 12:
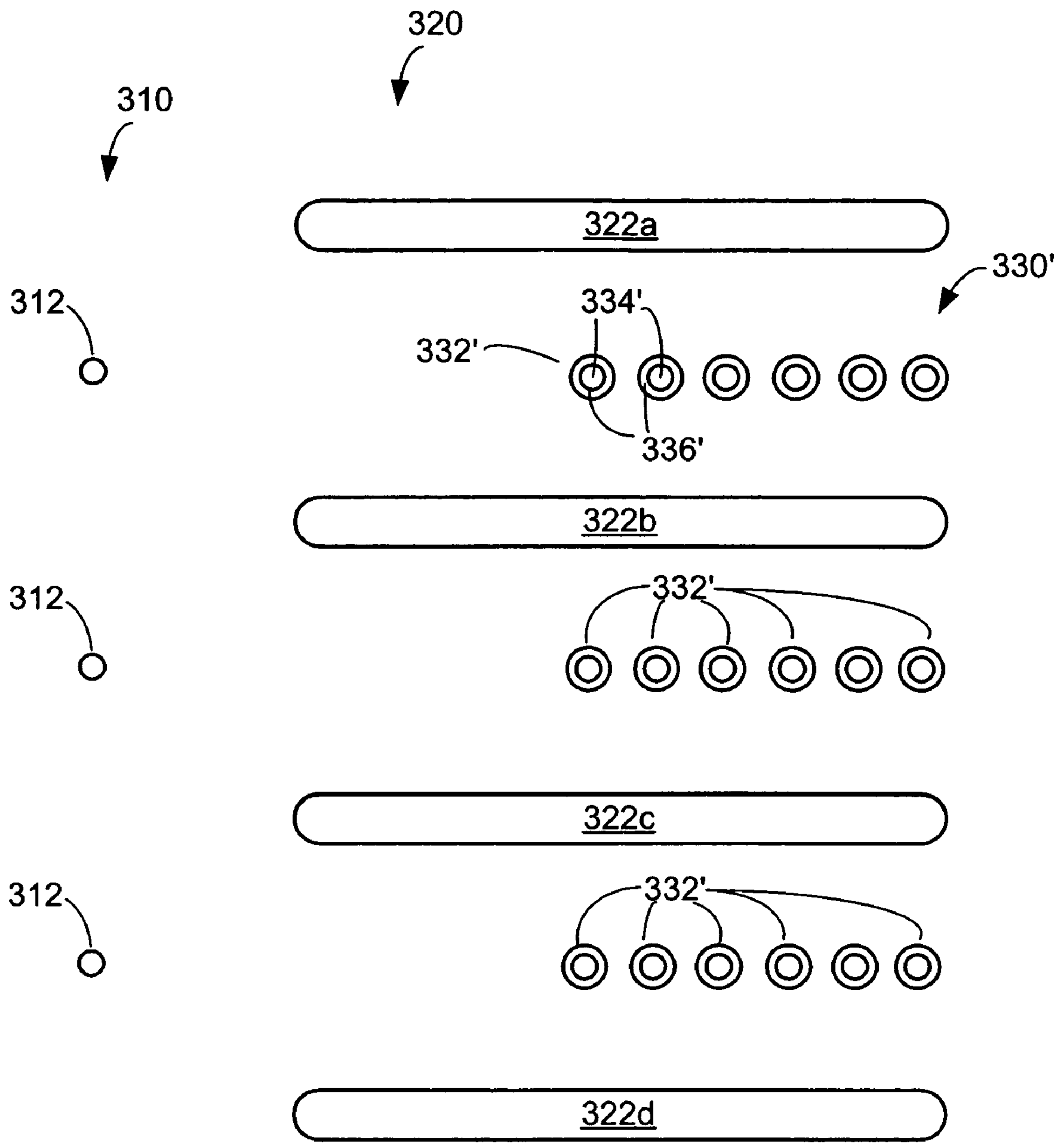

In the previous FIGS., the insulated driver electrodes 332 have been shown as including a generally plate like electrically conductive electrode 334 covered by a dielectric insulator 336. In alternative embodiments of the present invention, the insulated driver electrodes can take other forms. For example, referring to FIG. 12, the driver electrodes can be include a wire or rod-like electrical conductor 334' covered by dielectric insulation 336'. Although a single such insulated driver electrode 332' can be used, it is preferably to use a row of such insulated drivers electrodes 332', as shown in FIG. 12. The electric field between such a row of insulated driver electrodes 332' and the collector electrodes 322 will look similar to the corresponding electric field shown in FIG. 6.

In the various electrode arrangements described herein, emitter electrode(s) 312 in the first electrode array 310 can be fabricated, for example, from tungsten. Tungsten is sufficiently robust in order to withstand cleaning, has a high melting point to retard breakdown due to ionization, and has a rough exterior surface that seems to promote efficient ionization. The emitter electrodes 312 are likely wire-shaped, and are likely manufactured from a wire or, if thicker than a typical wire, still has the general appearance of a wire or rod. Alternatively, as in known in the art, other types of ionizers, such as pin or needle shaped electrodes can be used in place of a wire. For example, an elongated saw-toothed edge can be used, with each edge functioning as a corona discharge point. A column of tapered pins or needles would function similarly. As another alternative, a plate with a sharp downstream edge can be used as an emitter electrode. These are just a few examples of the emitter electrodes that can be used with embodiments of the present invention. Further, other materials besides tungsten can be used to produce the emitter electrodes 312.

Figure 13A:
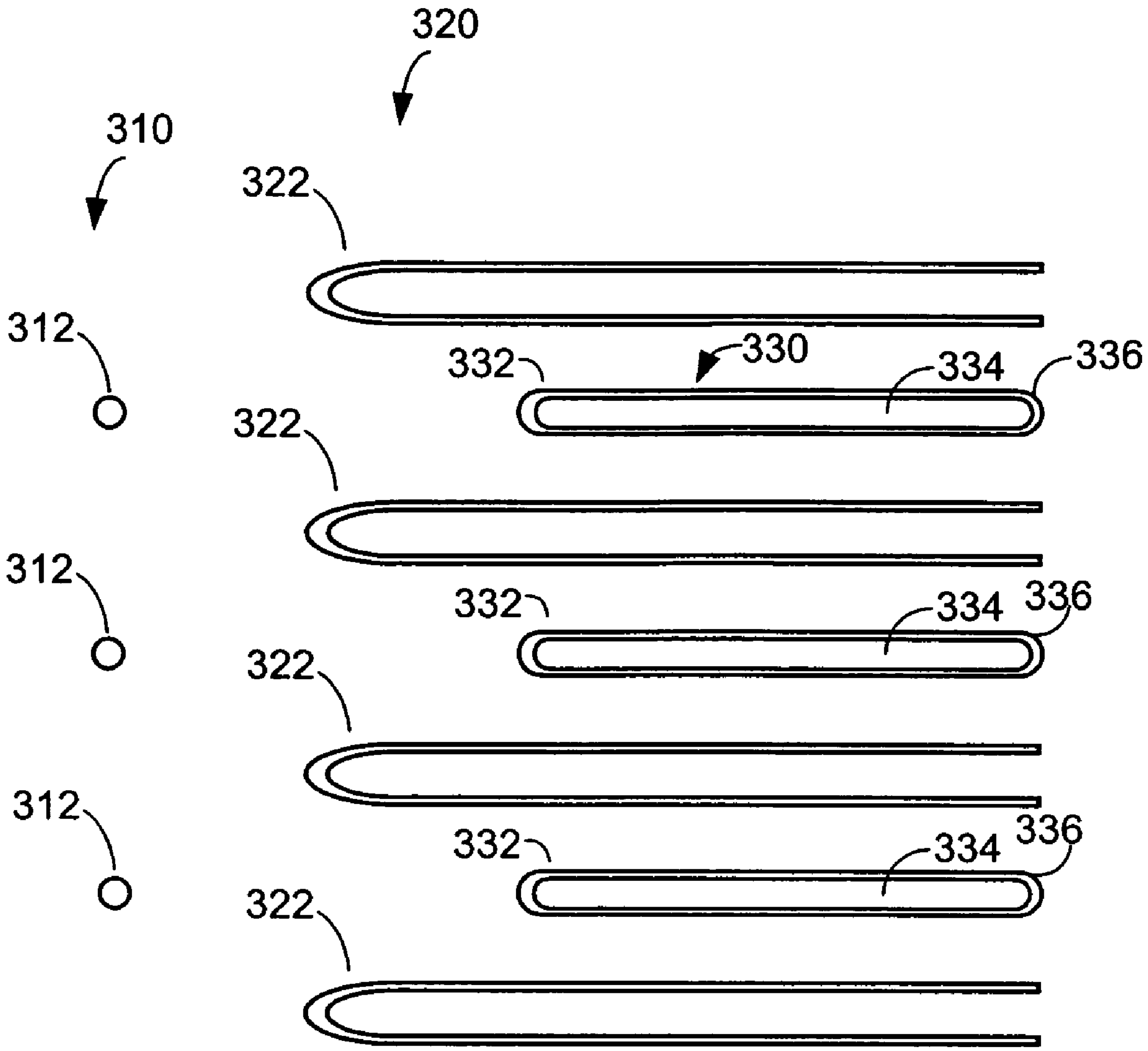
FIGS. 13A and 13B illustrates an electro-kinetic conditioner system, according to an embodiment of the present invention, wherein the collector electrodes are U-shaped.
Figure 13B:
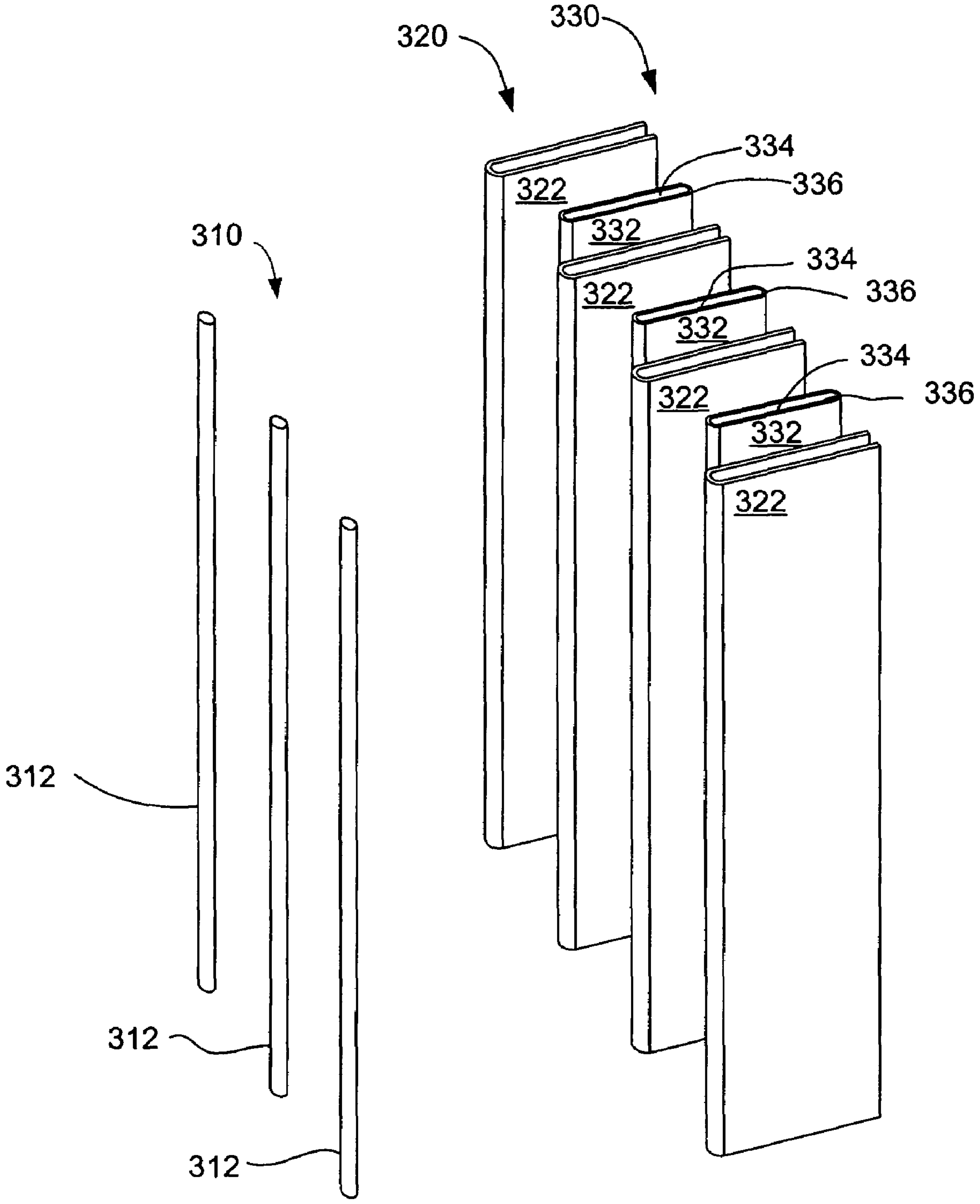

Collector electrodes 322 in the second electrode array 320 can have a highly polished exterior surface to minimize unwanted point-to-point radiation. As such, collector electrodes 322 can be fabricated, for example, from stainless steel and/or brass, among other materials. The polished surface of collector electrodes 322 also promotes ease of electrode cleaning. The collector electrodes 322 are preferably lightweight, easy to fabricate, and lend themselves to mass production. Accordingly, even though the collector electrodes can be solid, it is more practical that the collector electrodes be manufactured from sheet metal. When made from sheet metal, the sheet metal can be readily configured to define side regions and a bulbous nose region, forming a hollow, elongated "U"-shaped electrode, for example, as shown in FIG. 13A. Each "U"-shaped electrode has a nose and two trailing sides. Similarly, in embodiments including plate like insulated driver electrodes 332, the underlying driver electrodes can be made of a similar material and in a similar shape (e.g., "U" shaped) as the collector electrodes 322. FIG. 13B shows a perspective view of the electrode assembly shown in FIG. 13A. The corresponding perspective views for the electrode configurations discussed in the previous FIGS. will look similar. It is within the spirit and scope of the invention that the emitter electrodes 312 and collector electrodes 322, as well as the insulated driver electrodes 332, can have other shapes besides those specifically mentioned herein.

In the FIGS. discussed above, four collector electrodes 322 and three insulated driver electrodes 332 were shown, with either three emitter electrodes 312, or five emitter electrodes 312. These numbers of electrodes have been shown for example, and can be changed. Preferably there is at least a pair of collector electrodes with an insulated driver electrode therebetween to push charged particles toward the collector electrodes. However, it is possible to have embodiments with only one collector electrode, and one or more emitter electrodes. In such embodiments, the insulated driver electrode should be generally parallel to the collector electrode.

Preferably, there is at least one emitter electrode 312 for each pair of collector electrodes 322. In the embodiment depicted, each the emitter electrode 312 is preferably equidistant from the noses or leading edges of the two closest collector electrodes 322, as shown, for example, in FIG. 6. However, in certain embodiments, such as the one discussed with reference to FIG. 9, the location of the outermost emitter electrodes 312 may be change to alter the resulting electric fields in a desired manner. As discussed with reference to FIG. 8, adding emitter electrodes 312 may also be useful.

It may also be practical to add insulated driver electrodes an either sides of the outer collector electrodes (e.g., on either side of collector electrodes 322*a* and 322*d* shown in FIG. 8). This would push any charged particles passing adjacent to the outer surfaces of the outer collector electrodes (e.g., 322*a* and 322*d* in FIG. 8) toward the outer surfaces of the outer collector electrodes.

In some embodiments, the number N1 of emitter electrodes 312 in the emitter array 310 can differ by one relative to the number N2 of collector electrodes 322in the collector array 320. In many of the embodiments shown, N2>N1. However, if desired, additional emitter electrodes could be added at the outer ends of array 310 such that N1>N2, e.g., five emitter electrodes 312 compared to four collector electrodes 322, as in FIG. 8.

Figure 14:
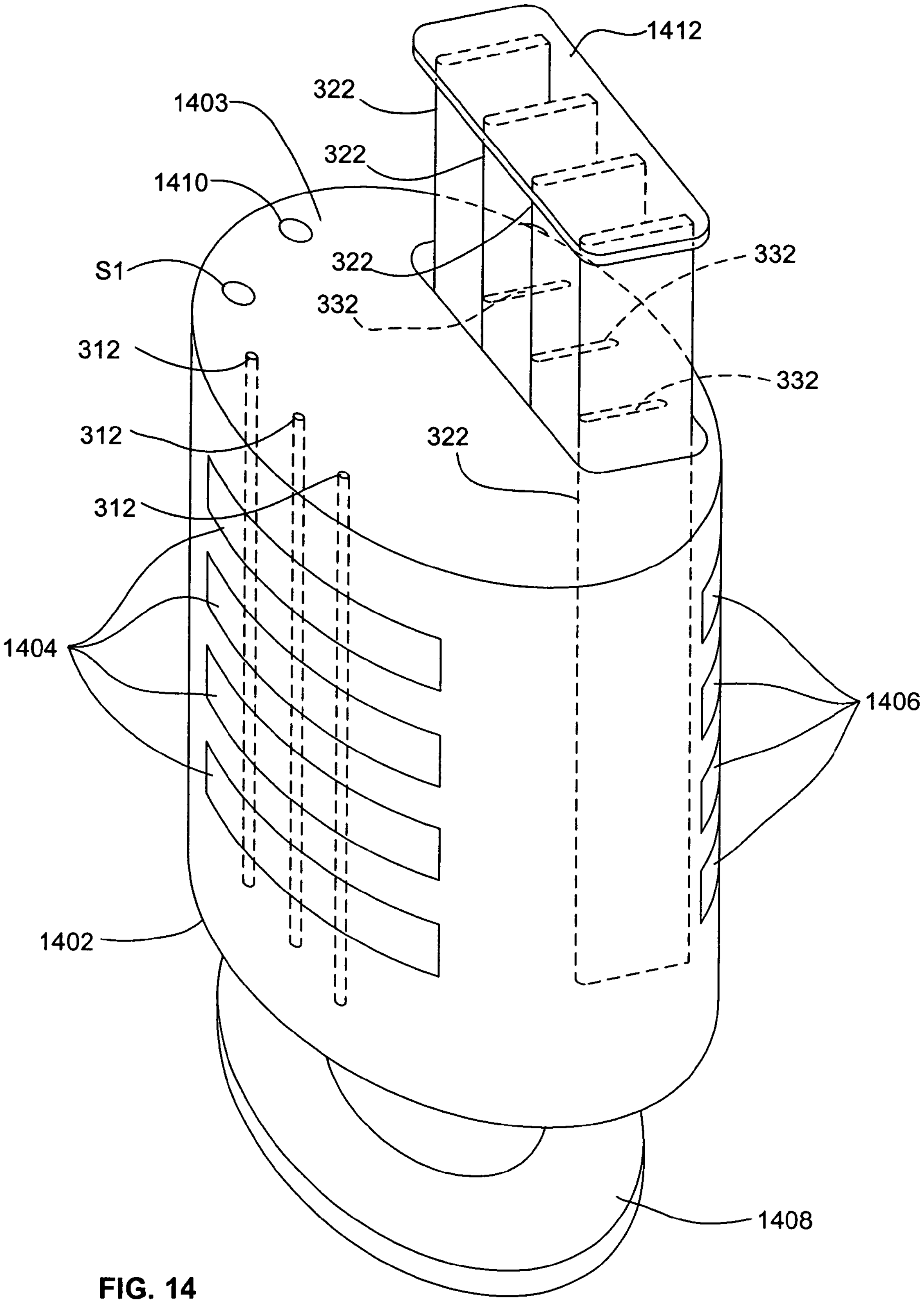
FIG. 14 illustrates a perspective view of an electro-kinetic conditioner unit, according to an embodiment of the present invention.

Referring now to FIG. 14, the above described electro-kinetic air transporter-conditioner systems are likely within or include a housing 1402. The housing likely includes rear-located intake vents 1404 and front located exhaust or outlet vents 1406, and a base pedestal 1408. Preferably, the housing 1402 is free standing and/or upstandingly vertical and/or elongated. The base 1408, which may be pivotally mounted to the remainder of the housing, allows the housing 1402 to remain in a vertical position.

Internal to the transporter housing 1402 is one of the electro-kinetic transporter and conditioner systems described above. The electro-kinetic transporter and conditioner system is likely powered by an AC-DC power supply that is energizable or excitable using switch S1. Switch S1, along with the other user operated switches such as a control dial 1410, are preferably located on or near a top 1403 of the housing 1402. The whole system is self-contained in that other than ambient air, nothing is required from beyond the transporter housing 1402, except perhaps an external operating voltage, for operation of the present invention.

A user-liftable handle member 1412 is preferably affixed the collector array 320 of collector electrodes 322, which normally rests within the housing 1402. The housing 1402 also encloses the array 310 of emitter electrodes 312 and the array 330 of insulated driver electrodes 332. In the embodiment shown, the handle member 1412 can be used to lift the collector array 310 upward causing the collector electrodes 322 to telescope out of the top of the housing 1402 and, if desired, out of the housing 1402 for cleaning, while the emitter electrode array 310 and insulated driver electrodes array 330 remain within the housing 1402. As is evident from FIG. 14, the collector array 310 can be lifted vertically out from the top 1403 of the housing along the longitudinal axis or direction of the elongated housing 1402. This arrangement with the collector electrodes 322 removable through a top portion of the housing 1402, makes it easy for a user to pull the collector electrodes 322 out for cleaning, and to return the collector electrodes 322, with the assistance of gravity, back to their resting position within the housing 1402. If desired, the emitter array 310 and/or the insulated driver array 330 may be made similarly removable.

There need be no real distinction between vents 1404 and 1406, except their location relative to the electrodes. These vents serve to ensure that an adequate flow of ambient air can be drawn into or made available to the electrodes, and that an adequate flow of ionized cleaned air moves out from housing 1402.

Figure 15:
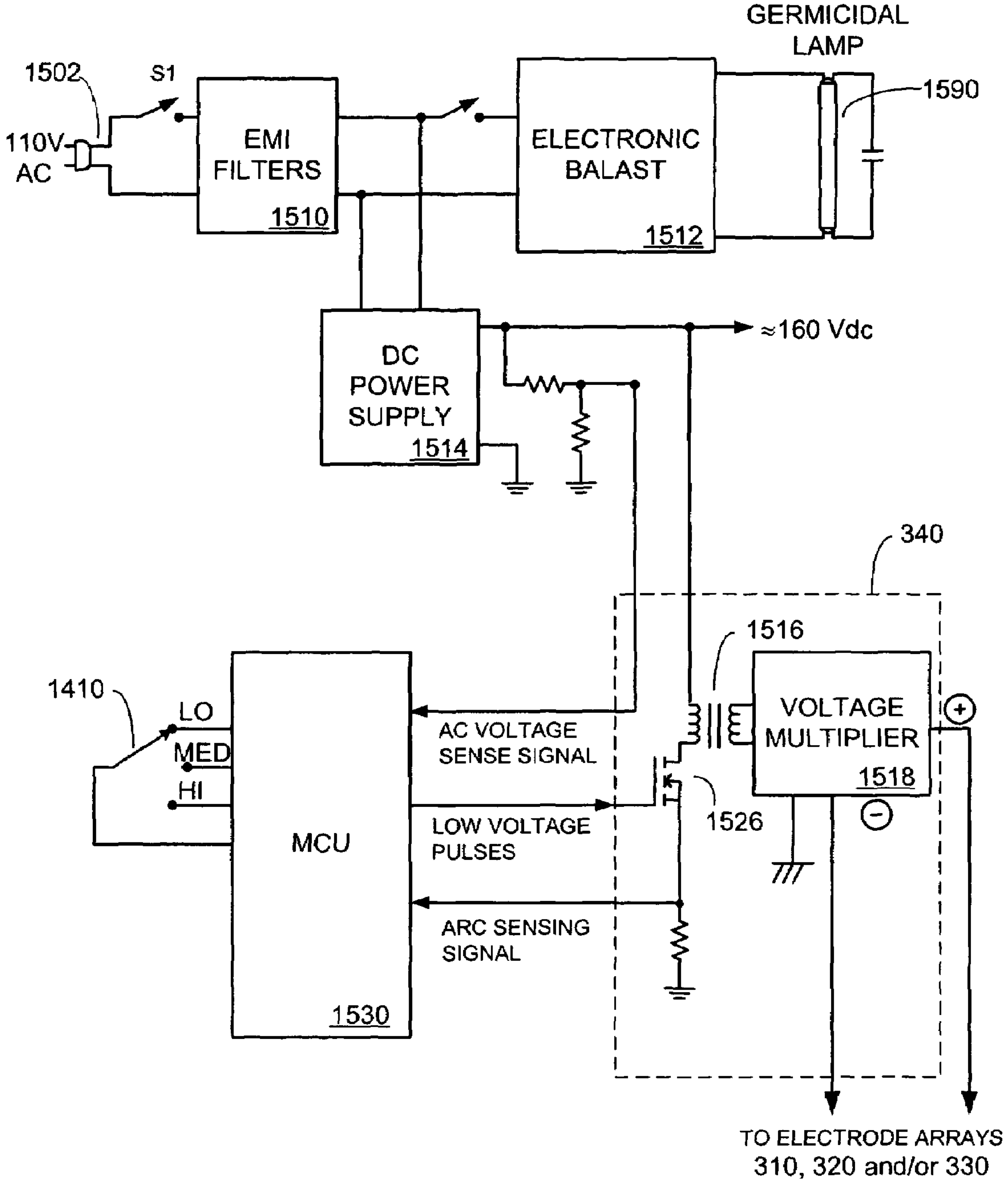
FIG. 15 is block diagram showing an exemplary implementation of a high voltage source that can be used with embodiments of the present invention.

The above described embodiments do not specifically include a germicidal (e.g., ultra-violate) lamp. However, a germicidal lamp can be included with the above configurations. Where the insulated driver electrodes are coated with an ozone reducing catalyst, the ultra-violate radiation from such a lamp may increase the effectiveness of the catalyst. The inclusion of a germicidal lamp is shown in FIG. 15. Additional details of the inclusion of a germicidal lamp are included in U.S. Pat. No. 6,544,485, entitled "Electro-Kinetic Device with Enhanced Anti-Microorganism Capability," and U.S. patent application Ser. No. 10/074,347, entitled "Electro-Kinetic Air Transporter and Conditioner Device with Enhanced Housing Configuration and Enhanced Anti-Microorganism Capability," each of which is incorporated herein by reference.

FIG. 15 is an electrical block diagram showing an exemplary implementation of the high voltage source 340 the can be used to power the various embodiments of the present invention discussed above. An electrical power cord 1502 that plugs into a common electrical wall socket can be used to accept a nominal 110 VAC. An electromagnetic interference (EMI) filter 1510 is placed across the incoming nominal 110 VAC line to reduce and/or eliminate high frequencies generated by the various circuits. In embodiments including a germicidal lamp 1590, an electronic ballast 1512 is electrically connected to the germicidal lamp 1590 to regulate, or control, the flow of current through the lamp 1590. Electrical components such as the EMI Filter 1510 and electronic ballast 1512 are well known in the art and do not require a further description.

A DC Power Supply 1514, which is well known, is designed to receive the incoming nominal 110 VAC and to output a first DC voltage (e.g., 160 VDC). The first DC voltage (e.g., 160 VDC) is shown as being stepped down through a resistor network to a second DC voltage (e.g., about 12 VDC) that a micro-controller unit (MCU) 1530 can monitor without being damaged. The MCU 1530 can be, for example, a Motorola 68HC908 series micro-controller, available from Motorola. In accordance with an embodiment of the present invention, the MCU 1530 monitors the stepped down voltage (e.g., about 12 VDC), which is labeled the AC voltage sense signal in FIG. 15, to determine if the AC line voltage is above or below the nominal 110 VAC, and to sense changes in the AC line voltage. For example, if a nominal 110VAC increases by 10% to 121 VAC, then the stepped down DC voltage will also increase by 10%. The MCU 1530 can sense this increase and then reduce the pulse width, duty cycle and/or frequency of the low voltage pulses it outputs to maintain the output power of the high voltage source 340 to be the same as when the line voltage is at 110 VAC. Conversely, when the line voltage drops, the MCU 1530 can sense this decrease and appropriately increase the pulse width, duty cycle and/or frequency of the low voltage pulses to maintain a constant output power. Such voltage adjustment features also enable the same unit to be used in different countries that have different nominal voltages than in the United States (e.g., in Japan the nominal AC voltage is 100 VAC).

Output voltage potentials of the high voltage source 340 can be provided to the emitter array 310, the collector array 320 and/or the insulated driver array 330, depending upon which embodiment of the present invention discussed above is being practiced. The high voltage source 340 can be implemented in many ways. In the exemplary embodiment shown, the high voltage source 340 includes an electronic switch 1526, a step-up transformer 1516 and a voltage multiplier 1518. The primary side of the step-up transformer 1516 receives the first DC voltage (e.g., 160 VDC) from the DC power supply. An electronic switch receives low voltage pulses (of perhaps 20-25 KHz frequency) from the MCU 1530. Such a switch is shown as an insulated gate bipolar transistor (IGBT) 1526. The IGBT 1526, or other appropriate switch, couples the low voltage pulses from the MCU 1530 to the input winding of the step-up transformer 1516. The secondary winding of the transformer 1516 is coupled to the voltage multiplier 1518, which outputs high voltage pulses that can be provided to the arrays 310, 320 and/or 330, based on which embodiment is implemented. In general, the IGBT 1526 operates as an electronic on/off switch. Such a transistor is well known in the art and does not require a further description. When driven, the high voltage source 340 receives the low input DC voltage (e.g., 160 VDC) from the DC power supply 1514 and the low voltage pulses from the MCU 1530, and generates high voltage pulses of, for example, 10 KV peak-to-peak, with a repetition rate of, for example, about 20 to 25 KHz.

Referring back to the embodiment of FIG. 3, the voltage multiplier 1518 can output, for example, +4 KV to the emitter array 310, and about −6 KV to the collector array 320. In this embodiment, the insulated driver array 330 is grounded. Thus, in this example there is a 10 KV voltage potential difference between the emitter array 310 and the collector array 320, and a 6 KV voltage potential difference between the insulated driver array 330 and the collector array 320.

Referring back to the embodiment of FIG. 4, the voltage multiplier 1518 can output, for example, −10 KV to the collector array 320, while both the emitter array 310 and the insulated driver array 330 are grounded. In this example, there is a 10 KV voltage potential difference between the emitter array 310 and the collector array 320, and a 10 KV difference between the insulated driver array 330 and the collector array 320.

Referring back to the embodiment of FIG. 5, the voltage multiplier 1518 can output, for example, −10 KV to the collector array 320, and +5 KV to the insulated driver array 330. In this embodiment the emitter array 310 is grounded. Thus, in this example there is a 10 KV voltage potential difference between the emitter array 310 and the collector array 320, and a 15 KV difference between the insulated driver array 330 and the collector array 320.

These are just a few examples of the various voltages the can be provided for a few of the embodiments discussed above. It is within the scope of the present invention for the voltage multiplier 1518 to produce greater or smaller voltages. The high voltage pulses can have a duty cycle of, for example, about 10%-15%, but may have other duty cycles, including a 100% duty cycle.

The MCU 1530 can receive an indication of whether the control dial 1410 is set to the LOW, MEDIUM or HIGH airflow setting. The MCU 1530 controls the pulse width, duty cycle and/or frequency of the low voltage pulse signal provided to switch 1526, to thereby control the airflow output, based on the setting of the control dial 1410. To increase the airflow output, the MCU 1530 can increase the pulse width, frequency and/or duty cycle. Conversely, to decrease the airflow output rate, the MCU 1530 can reduce the pulse width, frequency and/or duty cycle. In accordance with an embodiment, the low voltage pulse signal (provided from the MCU 1530 to the high voltage source 340) can have a fixed pulse width, frequency and duty cycle for the LOW setting, another fixed pulse width, frequency and duty cycle for the MEDIUM setting, and a further fixed pulse width, frequency and duty cycle for the HIGH setting. However, depending on the setting of the control dial 1410, the above described embodiment may produce too much ozone (e.g., at the HIGH setting) or too little airflow output (e.g., at the LOW setting). According, a more elegant solution, described below, can be used.

In accordance with an embodiment, the low voltage pulse signal created by the MCU 1530 modulates between a “high” airflow signal and a “low” airflow signal, with the control dial setting specifying the durations of the “high” airflow signal and/or the “low” airflow signal. This will produce an acceptable airflow output, while limiting ozone production to acceptable levels, regardless of whether the control dial 1410 is set to HIGH, MEDIUM or LOW. For example, the “high” airflow signal can have a pulse width of 5 microseconds and a period of 40 microseconds (i.e., a 12.5% duty cycle), and the “low” airflow signal can have a pulse width of 4 microseconds and a period of 40 microseconds (i.e., a 10% duty cycle). When the control dial 1410 is set to HIGH, the MCU 1530 outputs a low voltage pulse signal that modulates between the “low” airflow signal and the “high” airflow signal, with, for example, the “high” airflow signal being output for 2.0 seconds, followed by the “low” airflow signal being output for 8.0 second. When the control dial 1410 is set to MEDIUM, the “low” airflow signal can be increased to, for example, 16 seconds (e.g., the low voltage pulse signal will include the “high” airflow signal for 2.0 seconds, followed by the “low” airflow signal for 16 seconds). When the control dial 1410 is set to LOW, the “low” airflow signal can be further increased to, for example, 24 seconds (e.g., the low voltage pulse signal will include a “high” airflow signal for 2.0 seconds, followed by the “low” airflow signal for 24 seconds). Alternatively, or additionally, the frequency of the low voltage pulse signal (used to drive the transformer 1516) can be adjusted to distinguish between the LOW, MEDIUM and HIGH settings. These are just a few examples of how air flow can be controlled based on a control dial setting.

In practice, an electro-kinetic transporter-conditioner unit is placed in a room and connected to an appropriate source of operating potential, typically 110 VAC. The energized electro-kinetic transporter conditioner emits ionized air and small amounts of ozone via outlet vents 1460. The airflow is indeed electro-kinetically produced, in that there are no intentionally moving parts within unit. (Some mechanical vibration may occur within the electrodes). Additionally, because particles are collected on the collector electrodes 322, the air in the room is cleaned. It would also be possible, if desired, to further increase airflow by adding a fan. Even with a fan, the insulated driver electrode(s) 332 can be used to increase particle collecting efficiency by allowing the electrical field between the driver electrode(s) and collector electrodes to be increased beyond what would be allowable without the insulation.

Figure 16:
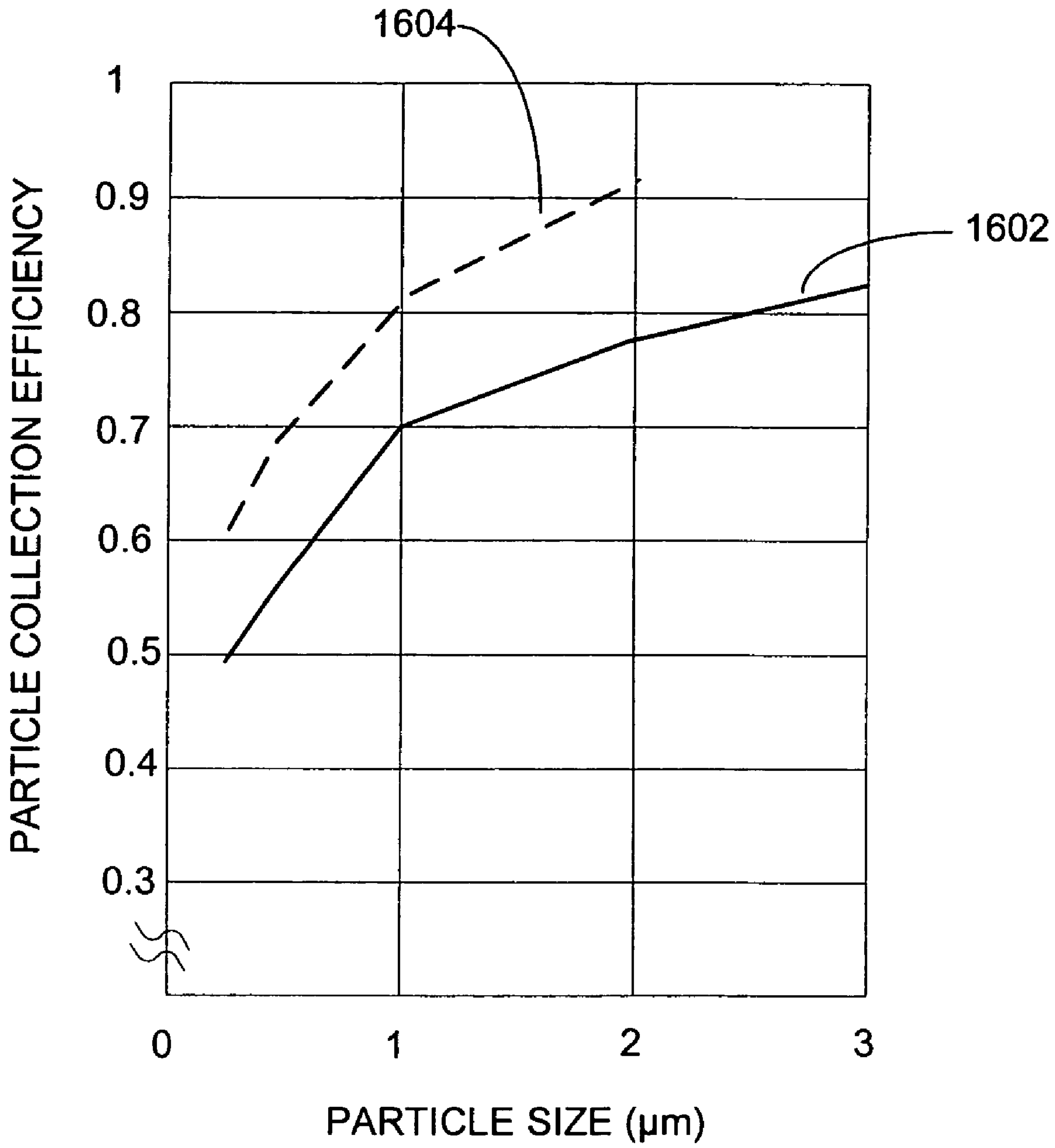
FIG. 16 is graph that is useful for showing how embodiments of the present invention can be used to increase particle collection efficiency.

Experiments have shown that insulating the driver electrodes have allowed the voltage potential between the collectors and driver(s) to be increased, thereby increasing particle collection efficiency. These experiments were performed using a test system including a single grounded emitter wire 312, a pair of collector electrodes 322, and a single driver electrode. In a first test it was determined that the voltage potential between the collector electrodes 322 and a non-insulated driver electrode (located between the collector electrodes 322) should be no more than 9.4 KV, with any higher voltage potential being very susceptible to arcing between the collectors and driver. Specifically, the collector electrodes 322 were placed at −15 KV, the non-insulated driver was placed at −5.6 KV, and the emitter wire 312 was grounded. The particle collecting efficiency was then measured for various particle sizes ranging. The results are shown as line 1602 in the graph of FIG. 16. As shown in FIG. 16, the collecting efficiency for small particles of about 0.3 μm was only about 50%.

The non-insulated driver electrode was then replaced with an insulated driver electrode 332 having the same dimensions. It was then determined that the voltage potential difference between the collector electrode 322 and the insulated driver electrode 332 could be increased to 15 KV without being highly susceptible to arcing between the collectors 322 and insulated driver 332. By increasing the voltage potential difference from 9.4 KV to 15 KV the electric field between the collector and drivers increased from about 750 V/mm to about 1200 V/mm. Specifically, the collector electrodes 322 were placed at 15 KV and the emitter electrode 312 and the insulated driver electrode 332 were both grounded. The results are shown as line 1604 in the graph of FIG. 16. As shown in FIG. 16, the collecting efficiency for small particles of about 0.3 μm increased to about 60%.

Experiments have also shown that particle collecting efficiency can be further increased by increasing the width (the dimension in the downstream direction) of the collector electrodes 322. However, this would also increase the cost and weight of a system, and thus, is a design tradeoff. But for given width of collector electrodes and driver electrodes, insulating the drivers will allow the electric field between the collectors and drivers to be increased (as compared to if the drivers were not insulated), thereby increasing particle collection efficiency.

The foregoing descriptions of the preferred embodiments of the present invention have been provided for the purposes of illustration and description. It is not intended to be exhaustive or to limit the invention to the precise forms disclosed. Many modifications and variations will be apparent to the practitioner skilled in the art. Modifications and variations may be made to the disclosed embodiments without departing from the subject and spirit of the invention as defined by the following claims. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed:

1. An air conditioner system comprising:

a. a housing;

b. an emitter electrode in the housing;

c. at least three collector electrodes in the housing positioned downstream of the emitter electrode; and d. at least two driver electrodes in the housing, wherein one driver electrode is located between adjacent collector electrodes, wherein a handle member is affixed to the collector electrodes so that the collector electrodes are separable from the driver electrodes and removable from the housing and the driver electrodes remain in the housing.

2. The system of claim 1 wherein the emitter electrode and the driver electrodes are grounded and further wherein the collector electrodes are negatively charged by a high voltage source.

3. The system of claim 1 wherein the emitter electrode further comprises two emitter electrodes.

4. The system of claim 1 wherein the driver electrodes are insulated.

5. The system of claim 1 wherein the driver electrodes are coated with an ozone reducing agent.

6. The system of claim 1 wherein the drivers are insulated and include an electrically conductive electrode covered by a dielectric material.

7. The system of claim 1 wherein the collector electrodes are removable through an upper portion of the housing.

8. An air conditioner system comprising:

a. a housing;

b. an ion generator within the housing, wherein the ion generator includes three collector electrodes removable from the housing; and c. two insulated driver electrodes within the housing, each driver electrode positioned between a pair of adjacent collector electrodes, wherein a handle member is affixed to the collector electrodes so that the collector electrodes are separable from the driver electrodes and removable from the housing and the driver electrodes remain in the housing.

9. The system of claim 8 wherein the ion generator further comprises an emitter electrode positioned upstream of the collector electrodes.

10. The system of claim 9 wherein at least one driver electrode is directly downstream and in-line with the emitter electrode.

11. The system of claim 8 wherein the collector electrodes are removable through an upper portion of the housing.

12. The system of claim 8 wherein the housing has a freestanding and elongated configuration.

13. The system of claim 8 wherein an upstream edge of each driver electrode is downstream of an upstream edge of adjacent collector electrodes.

14. An air conditioner system comprising:

a. an emitter electrode;

b. at least three collector electrodes at a downstream location with respect to the emitter electrode, the collector electrodes configured to be moved from the downstream location in a substantially vertical direction; and c. at least two driver electrodes at the downstream location, wherein a handle member is affixed to the collector electrodes so that the collector electrodes are separable from the driver electrodes and removable from a housing so that the driver electrodes may remain in the housing.

15. The system of claim 14 wherein the emitter electrode and the driver electrodes are grounded and further wherein the collector electrodes are negatively charged by a high voltage source.

16. The system of claim 14 wherein the emitter electrode further comprises two emitter electrodes.

17. The system of claim 14 wherein the driver electrodes are insulated.

18. The system of claim 14 wherein the driver electrodes are coated with an ozone reducing agent.

19. The system of claim 14 wherein the driver electrodes are directly downstream and in-line with the emitter electrode.

20. The system of claim 14 wherein the downstream location is within the housing which is upstanding, the collector electrodes vertically movable through an upper portion in the housing.

* * * * *